(12) United States Patent
Miller et al.

(10) Patent No.: US 8,340,015 B1
(45) Date of Patent: Dec. 25, 2012

(54) INCREMENTAL GATEWAY DEPLOYMENT IN A HUB-SPOKE SATELLITE COMMUNICATION SYSTEM USING STATIC SPOT BEAMS

(75) Inventors: Mark J. Miller, San Marcos, CA (US); Charles N. Pateros, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

(21) Appl. No.: 13/560,788

(22) Filed: Jul. 27, 2012

Related U.S. Application Data

(60) Provisional application No. 61/513,317, filed on Jul. 29, 2011, provisional application No. 61/568,569, filed on Dec. 8, 2011, provisional application No. 61/568,578, filed on Dec. 8, 2011, provisional application No. 61/591,810, filed on Jan. 27, 2012.

(51) Int. Cl.
*H04B 7/204* (2006.01)
(52) U.S. Cl. ......................................... 370/325
(58) Field of Classification Search .................. 370/310, 370/315, 316, 319, 321, 323, 325, 327, 328; 455/7, 11.1, 12.1, 13.3
See application file for complete search history.

(56) References Cited

U.S. PATENT DOCUMENTS

| | | | |
|---|---|---|---|
| 6,377,561 B1 | 4/2002 | Black | |
| 6,522,643 B1 | 2/2003 | Jacomb-Hood et al. | |
| 6,625,129 B1 | 9/2003 | Olds | |
| 6,801,565 B1 | 10/2004 | Bottomley et al. | |
| 6,898,428 B2 | 5/2005 | Thorburn et al. | |
| 6,957,078 B1 | 10/2005 | Yousefi et al. | |
| 6,992,992 B1 | 1/2006 | Cooper | |
| 7,773,942 B2 | 8/2010 | Hudson et al. | |
| 8,144,643 B2 | 3/2012 | Miller et al. | |
| 8,149,761 B2 | 4/2012 | Hudson et al. | |
| 8,195,090 B2 | 6/2012 | Treesh et al. | |

(Continued)

FOREIGN PATENT DOCUMENTS

EP   1328073 A2   7/2003

(Continued)

OTHER PUBLICATIONS

Lowry et al. Advanced Communications Technology Satellite. System Handbook, NASA TM-101490, revisions Sep. 30, 1993, 126 pages.

(Continued)

*Primary Examiner* — Obaidul Huq
(74) *Attorney, Agent, or Firm* — Kilpatrick Townsend & Stockton LLP

(57) ABSTRACT

A method for communicating includes providing a hub-spoke satellite comprising receivers, transmitters, transmit switches, and a gateway switch structure. Prior to a time T, each of at least P receivers are used to receive one of at least P signals from P gateway terminals. During one frame, the gateway switch structure is used to switch the at least P signals to the plurality of transmit switches. Each of the at least P signals are switched into fixed location beams. After time T, each of at least Q receivers are used to receive a different one of at least Q signals from Q gateway terminals. During one frame, the gateway switch structure is used to switch the at least Q signals to the plurality of transmit switches. Each of the at least Q signals are switched into fixed location beams. Q and P are non-zero positive integers and Q>P.

28 Claims, 8 Drawing Sheets

U.S. PATENT DOCUMENTS

| | | | |
|---|---|---|---|
| 8,218,476 | B2 | 7/2012 | Miller et al. |
| 2002/0159403 | A1 | 10/2002 | Reddy |
| 2003/0096610 | A1* | 5/2003 | Courtney et al. ............ 455/429 |
| 2003/0134592 | A1* | 7/2003 | Franzen et al. ............ 455/12.1 |
| 2004/0166801 | A1 | 8/2004 | Sharon et al. |
| 2005/0197060 | A1 | 9/2005 | Hedinger et al. |
| 2007/0135051 | A1 | 6/2007 | Zheng et al. |
| 2008/0146145 | A1 | 6/2008 | Pateros et al. |
| 2009/0023384 | A1* | 1/2009 | Miller ......................... 455/12.1 |
| 2010/0255776 | A1 | 10/2010 | Hudson et al. |
| 2012/0147812 | A1 | 6/2012 | Hudson et al. |

FOREIGN PATENT DOCUMENTS

| | | | |
|---|---|---|---|
| EP | 1478195 | A1 | 11/2004 |
| WO | 98/32245 | | 7/1998 |
| WO | 2008/027974 | A2 | 3/2008 |
| WO | 2011/139991 | A1 | 11/2011 |

OTHER PUBLICATIONS

Gedney et al. ACTS Technology Description and Results, National Aeronautics and Space Administration, Prepared under Contract NAS3-23790, Glen Research Center, Feb. 2000, 158 pages.

Gedney et al. Advanced Communications Technology Satellite (ACTS), NASA Lewis Research Center, 1989, 12 pages.

Berk et al. On-Board Processing for Future Satellite Communications Systems: Comparison of FDM, TDM, and Hybrid Accessing Schemes, MTR 8701 MITRE Bedford MA, Jun. 1982, 192 pages.

Signatron, Inc. 30/20 GHz FSS Feasibility Study Final Report JPL Contract No. 957641, Feb. 12, 1987, 296 pages.

Krawczyk, R. The Advanced Communications Technology Satellite—Performance, Reliability and Lessons Learned, ACTS Conference 2000 Proceedings, pp. 175-184.

Advanced Communications Technology Satellite (ACTS) Technology System Overview, retrieved on Jul. 27, 2012 at http://acts.grc.nasa.gov/technology/index.shtml, 2 pages.

Advanced Communications Technology Satellite (ACTS), Technology Spacecraft, retrieved on Jul. 27, 2012 at https://acts.grc.nasa.gov/technology/spacecraft/index.shtml, 2 pages.

Advanced Communications Technology Satellite (ACTS), Technology Spacecraft Specifications, retrieved on Jul. 27, 2012 at https://acts.grc.nasa.gov/technology/spacecraft/specs.shtml, 6 pages.

Advanced Communications Technology Satellite (ACTS), Technology Spacecraft, Multiple Hopping Beam Antennas, retrieved on Jul. 27, 2012 at https://acts.grc.nasa.gov/technology/spacecraft/multihop.shtml, 2 pages.

Advanced Communications Technology Satellite (ACTS), Technology Spacecraft, On-Board Baseband Processing (BBP) and Switching, retrieved on Jul. 27, 2012 at https://acts.grc.nasa.gov/technology/spacecraft/bbp.shtml, 2 pages.

Advanced Communications Technology Satellite (ACTS), Technology Spacecraft, Microwave Switch Matrix (MSM), retrieved on Jul. 27, 2012 at https://acts.grc.nasa.gov/technology/spacecraft/msm.shtml, 1 page.

Advanced Communications Technology Satellite (ACTS), Technology Spacecraft, Adaptive Rain Fade Compensation, retrieved on Jul. 27, 2012 at https://acts.grc.nasa.gov/technology/spacecraft/rainfade.shtml, 2 pages.

Advanced Communications Technology Satellite (ACTS), Technology Earth Stations, retrieved on Jul. 27, 2012 at https://acts.grc.nasa.gov/technology/earthstations/index.shtml, 2 pages.

Ogawa et al. Wideband InterNetworking Engineering Test and Demonstration Satellite (WINDS), National Institute of Information and Communications Technology, vol. 54 No. 4 Sections 1-7, 2007, retrieved on Jul. 27, 2012 at http://www.eoportal.org/directory/pres_WINDSWidebandInterNetworking engineeringtestandDemonstrationSatellite.html, 120 pages.

WINDS (Wideband InterNetworking engineering test and Demonstration Satellite), retrieved on Jul. 27, 2012 at http://www.eoportal.org/directory/pres_WINDSWidebandInterNetworking engineeringtestandDemonstrationSatellite.html, 14 pages.

Beam Forming Networks, Application Note, pp. 1-36. EMS Technologies, Inc. Aug. 2004, Revision B.

Gopal, R. *Innovations in Satellite Networking Technology and Products*, pp. 1-10. Hughes, SIA, Dec. 7, 2006.

Mallison et al., Enabling Technologies for the Eurostar Geomobile Satellite, p. 1-10. 19th AIAA International Communications Satellite Systems Conference. ICSSC, 2001.

Nelson, J. Top Satellite Technology At Forefront. Boeing Frontiers, 1(3). (2002). 5 pages.

Reudink, D.O. et al., A Scanning Spot-Beam Satellite System, Bell System Technical Journal, vol. 56, Oct. 1977, p. 1549-1560.

Rooney, K. J. *Evolving Satellite Markets and their Enabling Technologies*, pp. 1-18, Boeing Satellite Systems, Los Angeles, CA, Oct. 2002.

Roper et al., *WGS phased arrays support next generation DoD SATCOM capability*. IEEE International Symposium on Phased Array Systems and Technology, 2003, pp. 82-87 (2003).

Rustako, A. J. Jr. et al., An Experimental Scanning Spot Beam Satellite System Implementing 600 Mbit/Sec Tdma, IN: International Conference on Digital Satellite Communications, 6th, Phoenix, AZ, Sep. 19-23, 1983, Proceedings (A85-15451 04-32). New York, Institute of Electrical and Electronics Engineers, 1983, p. XI-18 to XI-23.

Satellite Provision of Next Generation Broadband Services in UK, Prepared for the Broadband Stakeholder Group, pp. 1-27, Oct. 29, 2007. Information Technology Telecommunications and Electronics Association, London.

Science Applications International Corporation. Satellite Communications Technology Database. NASA CR-2001-210563-PART2, Mar. 2001, 71 pages.

Stone, J. Spaceway 3 Takes Flight pp. 1-4. Near Earth LLC (Aug. 2007).

Sunderland et al., Megagate ASICs for the Thuraya Satellite Digital Signal Processor, pp. 1-8, Proceedings of the International Symposium on Quality Electronic Design, 2002 IEEE Computer Society (2002).

Torlak et al. Fast Estimation of Weight Vectors to Optimize Multi-Transmitter Broadcast Channel Capacity. IEEE Transactions on Single Processing, vol. 46, No. 1 Jan. 1998, 4 pages.

International Search Report corresponding to PCT Application No. PCT/US2010/026934, dated May 11, 2010, 12 pages.

International Search Report corresponding to PCT Application No. PCT/US2011/34845, dated Aug. 26, 2011, 13 pages.

U.S. Appl. No. 13/560,825, filed Jul. 27, 2012.

U.S. Appl. No. 13/463,079, filed May 3, 2012.

International Search Report and Written Opinion for PCT Application No. PCT/US2012/048695, mailed on Oct. 23, 2012, 12 pages.

Arnold et al., Mobile Communications in a Geosynchronous Regenerative Satellite Mesh (Rsm) System, pp. 1-6, Hughes Network Systems, Germantown, Maryland, 2006.

Couchman, A. et al. Defocused Array Fed Reflector Antennas for Ka, Broad Band Satellites, pp. 1-8, 2005.

Franchi et al., Technology Trends and Maket Drivers for Broadband Mobile Via Satellite: Inmarsat Bgan, pp. 1-9, London, United Kingdom, 2001.

Gopal et al., Regenerative Satellite Mesh System for Realtime Multi-Party Multimedia Traffic Hughes Network Systems, LLC (Hughes) Germantown, MD, 2009.

Gopal et al., Technology Readiness of Future Generation Networks Leveraging Regenerative Satellite Mesh Architecture—A Spaceway Perspective, pp. 1-7, Hughes Network Systems, LLC, Germantown, MD, 2006.

Hadinger et al., Next Generation High Capacity Ka-Band Satellite Systems, pp. 1-8, Northrop Grumman Space Technology, Redondo Beach, CA., 2007.

Kitao et al., Proto-Flight Model Development of the Multi-beam Active Phased Array Antenna for WINDS, pp. 1-4, 2007.

"Kizuna" (WINDS) (Wideband InterNetworking engineering test and Demonstration Satellite) (Launched by H-IIA F14), WINDS Project Team, Office of Space Applications, Japan Aerospace Exploration Agency, 17 pages, 2008.

Whitefield et al., Spaceway Now and in the Future: On-Board IP Packet Switching Satellte Communication Network, pp. 1-7, Hughes Network Systems, LLC, Germantown, MD, 2006.

\* cited by examiner

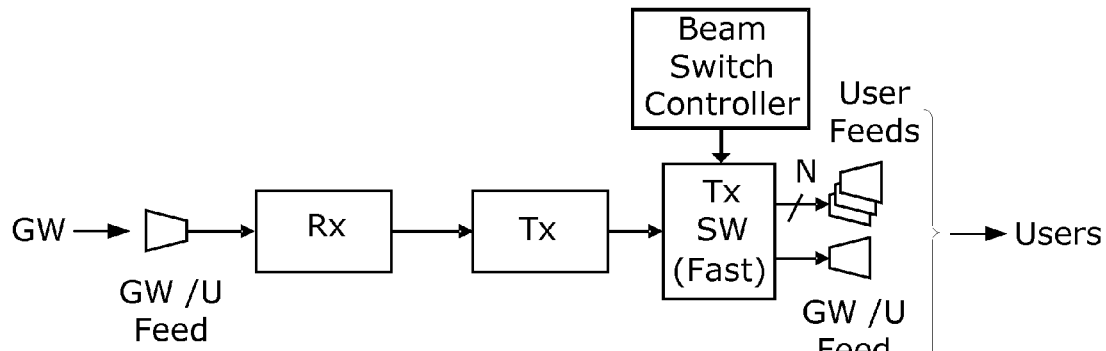
FIG. 2A – Forward Pathway
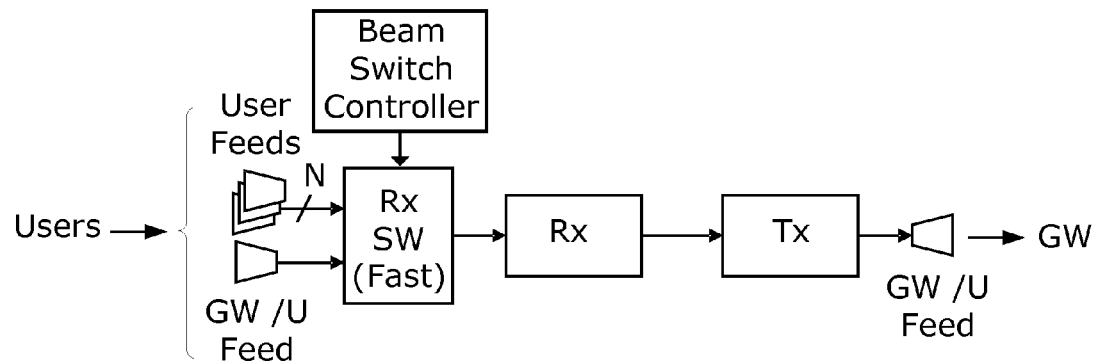
FIG. 2B – Return Pathway
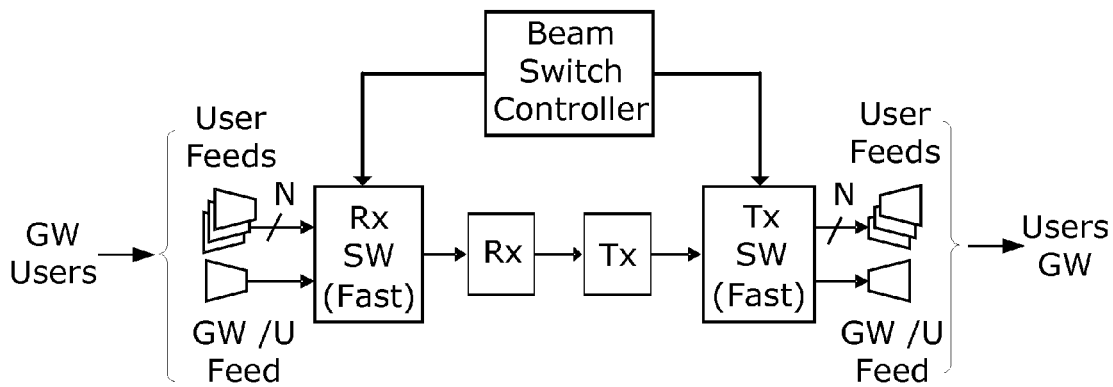
FIG. 2C – Forward / Return Pathway

INCREMENTAL GATEWAY DEPLOYMENT IN A HUB-SPOKE SATELLITE COMMUNICATION SYSTEM USING STATIC SPOT BEAMS

CROSS-REFERENCES TO RELATED APPLICATIONS

The present application claims benefit of priority under 35 U.S.C. §119(e) of U.S. Provisional Application Nos. 61/513,317, filed Jul. 29, 2011; 61/568,569, filed Dec. 8, 2011; 61/568,578, filed Dec. 8, 2011; and 61/591,810, filed Jan. 27, 2012; the entire contents of which are incorporated herein by reference in their entirety for all purposes.

FIELD OF THE INVENTION

The present invention relates generally to satellite communication systems and, more particularly, to incremental gateway deployment in a hub-spoke satellite communication system using static (e.g., fixed location) spot beams.

BACKGROUND

A hub-spoke satellite communication system typically includes a constellation of satellites that link gateway terminals with users terminals. The gateway terminals provide an interface with a network such as the Internet or a public switched telephone network. Each gateway terminal typically services a number of user terminals located in one or more spot beams.

Hub-spoke satellite communication systems have a high initial cost. Before user terminals can be serviced, hub-spoke spot beam satellites must be built and launched and the gateway terminals must be deployed. After service is initiated, it takes time to build up a subscriber base. During this initial startup period, the system is utilized at less than full capacity.

SUMMARY

Some embodiments of the present invention provide incremental gateway deployment in a hub-spoke satellite communication system using fixed location beams.

In accordance with an embodiment of the invention, a method for communicating using a hub-spoke satellite having a forward link capability includes providing the hub-spoke satellite. The hub-spoke satellite may include a plurality of receivers having inputs and outputs and a plurality of transmitters having inputs and outputs. The inputs of the plurality of transmitters may be coupled to the outputs of the plurality of receivers. A plurality of transmit switches may be coupled to the outputs of the plurality of transmitters. The hub-spoke satellite may also include a gateway switch structure coupled to one of: (a) the inputs of the plurality of receivers, and (b) the outputs of the plurality receivers and the inputs of the plurality of transmitters. Each transmit switch in the plurality of transmit switches may be used to sequentially switch a forward link signal into multiple fixed location beams according to a beam group transmit switching pattern. Prior to a time T, the method may include using each of at least P receivers in the plurality of receivers to receive a different one of at least P forward link signals from P gateway terminals. In the duration of one frame, the gateway switch structure may be used to sequentially switch the at least P forward link signals from the P gateway terminals, in order to provide the at least P forward link signals to the plurality of transmit switches, according to a first gateway switching pattern. The gateway switch structure may also be used to sequentially switch each of the at least P forward link signals into fixed location beams according to a first beam group transmit switching pattern. After time T, the method may include using each of at least Q receivers in the plurality of receivers to receive a different one of at least Q forward link signals from Q gateway terminals. In the duration of one frame, the gateway switch structure may be used to sequentially switch the at least Q forward link signals from the Q gateway terminals, in order to provide the at least Q forward link signals to the plurality of transmit switches, according to a second gateway switching pattern. The gateway switch structure may also be used to sequentially switch each of the at least Q forward link signals into fixed location beams according to a second beam group transmit switching pattern. P and Q may both be non-zero, positive integers, and Q>P. The first and second gateway switching patterns may be different.

In an embodiment, the at least P receivers may consist of exactly P receivers, and the P gateway terminals may each transmit one signal on a single polarization.

In another embodiment, the at least P receivers may consist of exactly 2*P receivers, and the P gateway terminals may each transmit two signals on two different polarizations.

In another embodiment, the gateway switch structure may include a switch matrix positioned between the plurality of receivers and the plurality of transmitters.

In another embodiment, the gateway switch structure may include at least one receive-side outer switch positioned before the plurality of receivers. In some embodiments, the plurality of receivers may include R receivers, where R is a non-zero, positive integer, and R>=Q>P. The at least one receive-side outer switch may include one 1:R switch for receiving a first forward link signal, the 1:R switch associated with a first switching speed allowing switching within the duration of one frame. The at least one receive-side outer switch may also include a plurality of 2:1 switches, each for receiving (a) an output of the 1:R switch and (b) one of R−1 other forward link signals. Each of the plurality of 2:1 switches may be associated with a second switching speed allowing switching at time T. In other embodiments, the plurality of receivers may include R receivers, where R is a non-zero, positive integer, and R>=Q>P. The at least one receive-side outer switch may include a first bank of switches, including 1:R, 1:(R−1), . . . , 1:2 switches, each associated with a first switching speed allowing switching within the duration of one frame. The at least one receive-side outer switch may also comprise a second bank of switches following the first bank of switches, the second bank of switches including 2:1, 3:1, . . . , (R−1):1 switches, each associated with a second switching speed allowing switching at time T. The second bank of switches may further include an R:1 switch associated with the first switching speed allowing switching within the duration of one frame. In yet other embodiments, the plurality of receivers may comprise R receivers, where R is a non-zero, positive integer, and R>=Q>P. The at least one receive-side outer switch may comprise a first bank of switches, including a 1:R switch and a 1:(R/2) switch, each associated with a first switching speed allowing switching within the duration of one frame. The at least one receive-side outer switch may also comprise a second bank of switches following the first bank of switches, each associated with a second switching speed allowing switching at time T.

In another embodiment, each of the plurality of receivers may comprise a low noise amplifier (LNA).

In another embodiment, each of plurality of transmitters may comprise a high power amplifier (HPA).

In another embodiment, the first and second beam group transmit switching patterns may be different.

In another embodiment, the first and second beam group transmit switching patterns may be the same.

In yet another embodiment, the hub-spoke satellite may have return link capability in addition to forward link capability and further comprise a plurality of receive switches coupled to the inputs of the plurality of receivers. The gateway switch structure may be coupled to one of: (a) the inputs of the plurality of receivers and the outputs of the plurality of transmitters, and (b) the outputs of the plurality receivers and the inputs of the plurality of transmitters. Each receive switch in the plurality of receive switches may be used to sequentially switch return link signals from fixed location beams into a receiver according to a beam group receive switching pattern. Prior to time T, the method may include sequentially switching the return link signals from multiple fixed location beams into the plurality of receivers according to a first beam group receive switching pattern. In the duration of one frame, the gateway switch structure may be used to sequentially switch the return link signals to at least P transmitters in the plurality of transmitters according to the first gateway switching pattern. Each of the at least P transmitters may be used to transmit a different one of the return link signals to one of the P gateway terminals. After time T, the method may include sequentially switching the return link signals from multiple fixed location beams into the plurality of receivers according to a second beam group receive switching pattern. In the duration of one frame, the gateway switch structure may be used to sequentially switch the return link signals to at least Q transmitters in the plurality of transmitters according to the second gateway switching pattern. Each of the at least Q transmitters may be used to transmit a different one of the return link signals to one of the Q gateway terminals.

In accordance with another embodiment of the invention, a satellite communication system having a forward link capability may include a plurality of gateway terminals, a plurality of user terminals, and a hub-spoke satellite for providing communications between the gateway terminals and the user terminals. The hub-spoke satellite may comprise a plurality of receivers having inputs and outputs and a plurality of transmitters having inputs and outputs. The inputs of the plurality of transmitters may be coupled to the outputs of the plurality of receivers. A plurality of transmit switches may be coupled to the outputs of the plurality of transmitters. A gateway switch structure may be coupled to one of: (a) the inputs of the plurality of receivers, and (b) the outputs of the plurality receivers and the inputs of the plurality of transmitters. Each transmit switch in the plurality of transmit switches may be configured to sequentially switch a forward link signal into multiple fixed location beams according to a beam group transmit switching pattern. Prior to a time T, at least P receivers in the plurality of receivers may each be configured to receive a different one of at least P forward link signals from P gateway terminals. In the duration of one frame, the gateway switch structure may be configured to sequentially switch the at least P forward link signals from the P gateway terminals, in order to provide the at least P forward link signals to the plurality of transmit switches, according to a first gateway switching pattern. Each of the at least P forward link signals may be sequentially switched into fixed location beams according to a first beam group transmit switching pattern. After time T, at least Q receivers in the plurality of receivers may each be configured to receive a different one of at least Q forward link signals from Q gateway terminals. In the duration of one frame, the gateway switch structure may be configured to sequentially switch the at least Q forward link signals from the Q gateway terminals, in order to provide the at least Q forward link signals to the plurality of transmit switches, according to a second gateway switching pattern. Each of the at least Q forward link signals may be sequentially switched into fixed location beams according to a second beam group transmit switching pattern. P and Q may both be non-zero, positive integers, and Q>P. The first and second gateway switching patterns may be different.

In accordance with another embodiment of the invention, a hub-spoke satellite having a forward link capability may include a plurality of receivers having inputs and outputs and a plurality of transmitters having inputs and outputs. The inputs of the plurality of transmitters may be coupled to the outputs of the plurality of receivers. A plurality of transmit switches may be coupled to the outputs of the plurality of transmitters. Each transmit switch in the plurality of transmit switches may be configured to sequentially switch a forward link signal into multiple fixed location beams according to a beam group transmit switching pattern. A gateway switch structure may be coupled to one of: (a) the inputs of the plurality of receivers, and (b) the outputs of the plurality receivers and the inputs of the plurality of transmitters. Prior to a time T, at least P receivers in the plurality of receivers may each be configured to receive a different one of at least P forward link signals from P gateway terminals. In the duration of one frame, the gateway switch structure may be configured to sequentially switch the at least P forward link signals from the P gateway terminals, in order to provide the at least P forward link signals to the plurality of transmit switches, according to a first gateway switching pattern. Each of the at least P forward link signals may be sequentially switched into fixed location beams according to a first beam group transmit switching pattern. After time T, at least Q receivers in the plurality of receivers may each be configured to receive a different one of at least Q forward link signals from Q gateway terminals. In the duration of one frame, the gateway switch structure may be configured to sequentially switch the at least Q forward link signals from the Q gateway terminals, in order to provide the at least Q forward link signals to the plurality of transmit switches, according to a second gateway switching pattern. Each of the at least Q forward link signals is sequentially switched into fixed location beams according to a second beam group transmit switching pattern. P and Q may both be non-zero, positive integers, and Q>P. The first and second gateway switching patterns may be different.

In accordance with yet another embodiment, a hub-spoke satellite having a forward link capability may include, prior to a time T, means for receiving at least P forward link signals from P gateway terminals, means for sequentially switching the at least P forward link signals from the P gateway terminals in the duration of one frame, in order to provide the at least P forward link signals to a plurality of transmit switches, according to a first gateway switching pattern, and means for sequentially switching each of the at least P forward link signals into fixed location beams according to a first beam group transmit switching pattern. The hub-spoke satellite having the forward link capability may also include, after time T, means for receiving at least Q forward link signals from Q gateway terminals, means for sequentially switching the at least Q forward link signals from the Q gateway terminals in the duration of one frame, in order to provide the at least Q forward link signals to the plurality of transmit switches, according to a second gateway switching pattern, and means for sequentially switching each of the at least Q forward link signals into fixed location beams according to a second beam group transmit switching pattern. P and Q may both be non-zero, positive integers, and Q>P. The first and second gateway switching patterns may be different.

BRIEF DESCRIPTION OF THE DRAWINGS

In some of the drawings a sub-label is associated with a reference numeral and follows a hyphen to denote one of multiple similar components. When reference is made to a reference numeral without specifying an existing sub-label, it is intended to refer to all such similar components.

FIGS. 2A-2C are simplified block diagrams of pathways in accordance with some embodiments of the present invention;

DETAILED DESCRIPTION

Figure 1:
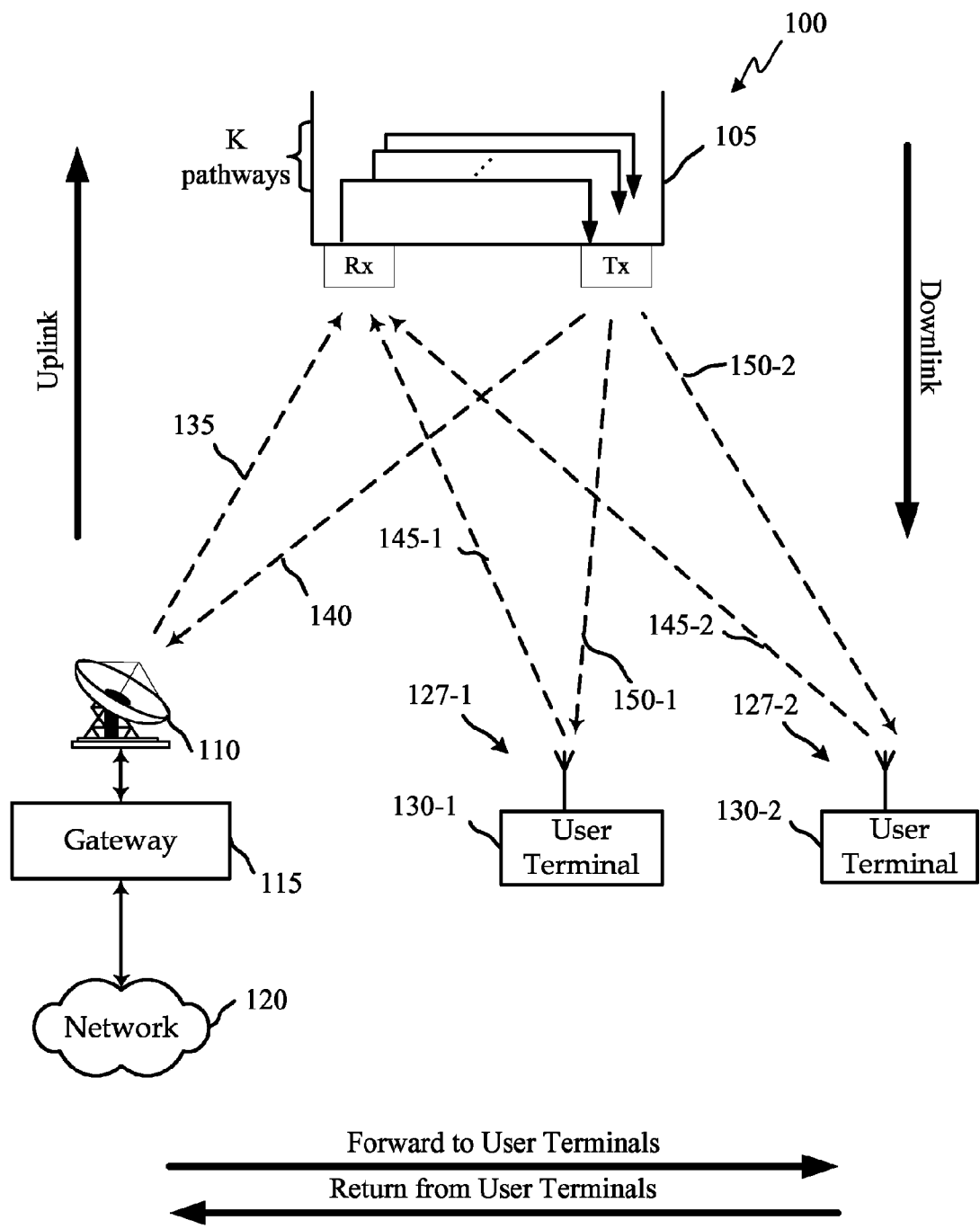
FIG. 1 is a simplified diagram of a hub-spoke satellite communication system in accordance with an embodiment of the present invention.

To provide high capacity over large coverage areas, a hub-spoke satellite system may employ a large number of focused user spot beams that illuminate user terminals. These user terminals may be serviced by gateway terminals that provide an interface to data services such as voice, video, web browsing, email, etc. Gateway terminals are typically associated with a specific spot beam (or beams) and the deployment of an associated gateway is required before providing service to its user spot beam coverage area. Embodiments of the present invention provide incremental gateway deployment such that service may be provided to coverage areas associated with other gateways up to and including the full coverage area of the satellite system. The capacity is still limited to the capability of the deployed gateways, but additional gateway terminals may be added over time to increase capacity up to the maximum capacity.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, may occur in amounts that do not preclude the effect the characteristic was intended to provide. Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The term "coupled" as used herein does not require that the components be directly connected to each other. Instead, the term is intended to also include configurations with indirect connections where one or more other components may be included between coupled components. For example, such other components may include amplifiers, attenuators, isolators, directional couplers, redundancy switches, and the like.

FIG. 1 is a simplified diagram of a hub-spoke satellite communication system 100 in accordance with an embodiment of the present invention. The satellite communication system 100 includes a satellite 105 linking a gateway terminal 115 with one or more user terminals 130. The satellite communication system 100 may use a number of network architectures consisting of space and ground segments. The space segment may include more than one satellite while the ground segment may include a large number of user terminals, gateway terminals, network operations centers (NOCs), satellite and gateway terminal command centers, and the like. These elements are not shown in the figure for clarity.

The gateway terminal 115 is sometimes referred to as a hub or ground station. The gateway terminal 115 may service communication links 135, 140 between the gateway terminal 115 and the satellite 105. The gateway terminal 115 may also schedule traffic to the user terminals 130. Alternatively, the scheduling may be performed in other parts of the satellite communication system 100 (e.g., at one or more NOCs and/or gateway command centers—neither of which are shown in this embodiment).

The gateway terminal 115 may also provide an interface between a network 120 and the satellite 105. The gateway terminal 115 may receive data and information from the network 120 that is directed the user terminals 130. The gateway terminal 115 may format the data and information for delivery to the user terminals 130 via the satellite 105. The gateway terminal 115 may also receive signals carrying data and information from the satellite 105. This data and information may be from the user terminals 130 and directed to destinations accessible via the network 120. The gateway terminal 115 may format this data and information for delivery via the network 120.

The network 120 may be any type of network and may include, for example, the Internet, an IP network, an intranet, a wide-area network (WAN), a local-area network (LAN), a virtual private network (VPN), a public switched telephone network (PSTN), a public land mobile network, and the like. The network 120 may include both wired and wireless connections as well as optical links. The network 120 may connect the gateway terminal 115 with other gateway terminals that may be in communication with the satellite 105 or with other satellites.

The gateway terminal 115 may use one or more antennas 110 to transmit forward uplink signals 135 to the satellite 105 and to receive return downlink signals 140 from the satellite 105. The antenna 110 shown in FIG. 1 includes a reflector with high directivity in the direction of the satellite 105 and low directivity in other directions. The antenna 110 may be implemented in a variety of alternative configurations and include operating features such as high isolation between orthogonal polarizations, high efficiency in the operational frequency bands, low noise, and the like.

In some satellite communication systems there may be a limited frequency spectrum available for transmission. Communication links 135, 140 between the gateway terminal 115 and the satellite 105 may use the same, overlapping, or different frequencies compared to the communication links 145, 150 between the satellite 105 and the user terminals 130. In some embodiments, the gateway terminal 115 may be located away from the user terminals 130, which enables frequency re-use. In other embodiments, the user terminals 130 may be located near the gateway terminal 115.

The satellite 105 may be a geostationary satellite that is configured to receive and transmit signals. The satellite 105 may receive the forward uplink signals 135 from the gateway terminal 115 and transmits corresponding forward downlink signals 150 to the user terminals 130. The satellite 105 may also receive return uplink signals 145 from the user terminals 130 and transmits corresponding return downlink signals 140 to the gateway terminal 115.

The satellite 105 may include one or more fixed directional antennas for reception and transmission of the signals 135, 140, 145, 150. A directional antenna may include a fixed reflector with one or more feed horns for each spot beam. The feed horns may be employed for receiving uplink signals 135, 145 and transmitting downlink signals 140, 150. The fixed feed of a directional antenna is in contrast to a more complex phased-array antenna that includes a number of phase combiners connected to a number of antenna elements.

A spot beam may be a path along which a signal travels to or from the satellite 105. Contours of a spot beam may be determined in part by the particular antenna design and depend on factors such as location of feed horn relative to a reflector, size of the reflector, type of feed horn, etc. Each spot beam may generally have a conical shape (typically circular or elliptical) that extends between the antenna and earth, illuminating a spot beam coverage area for both transmit and receive operations. A spot beam coverage area generally corresponds to an intersection between a spot beam and the earth's surface and may illuminate terminals that are not on the earth surface such as airborne user terminals, etc. In some embodiments, directional antennas may be used to form fixed location spot beams (or spot beams that are associated with substantially the same spot beam coverage area over time). This is in contrast to dynamic phased-array antennas that may be used to almost instantly change spot beam locations and their associated spot beam coverage areas. The directional antenna may be repointed, typically by mechanical means, but not fast enough to allow capacity flexibility as discussed herein.

The satellite 105 may operate in a multiple spot-beam mode, receiving and transmitting a number of signals in different spot beams. In the embodiment shown in FIG. 1, the gateway 115 and the user terminals 130 may be within the same or different spot beams. Each spot beam may use a single carrier (i.e., one carrier frequency), a contiguous frequency range, or a number of frequency ranges.

The satellite 105 may include a number of non-regenerative pathways (represented as K pathways in this embodiment). Each of the K pathways may be allocated as a forward pathway or a return pathway at any given instant in time. The uplink signals 135, 145 received by the satellite 105 may be directed along one or more of the pathways before being transmitted as downlink signals 140, 150.

The signals are not demodulated and re-modulated as in a regenerative or processing satellite architecture. Instead, signal manipulation by a non-regenerative satellite is generally limited to functions such as frequency translation, polarization conversion, filtering, amplification, and the like.

The forward downlink signals 150 may be transmitted from the satellite 105 to one or more of the user terminals 130. The user terminals 130 may receive the forward downlink signals 150 using antennas 127. In one embodiment, an antenna and a user terminal together comprise a very small aperture terminal (VSAT) with the antenna measuring approximately 0.75 meters in diameter and having approximately 2 watts of power. In other embodiments, a variety of other types of antennas 127 may be used to receive the forward downlink signals 150 from the satellite 105. Each of the user terminals 130 may comprise a single user terminal or a hub or router coupled to other user terminals. Each of the user terminals 130 may be connected to various consumer premises equipment (CPE) such as computers, local area networks, internet appliances, wireless networks, and the like.

The user terminals 130 may transmit data and information to a destination accessible via the network 120. The user terminals 130 may transmit the return uplink signals 145 to the satellite 105 using the antennas 127. The user terminals 130 may transmit the signals according to a variety of physical layer transmission, modulation and coding techniques including, for example physical layer signaling defined by standards such as, DVB (e.g. DVB-S2, DVB-RCS), WiMAX, LTE, DOCSIS, and similar standards in their native or adapted (modified) forms. In various embodiments, the physical layer techniques may be the same or different for each of the links 135, 140, 145, 150.

FIGS. 2A-2C are simplified block diagrams of pathways in accordance with some embodiments of the present invention. These pathways may correspond to some of the K pathways shown in FIG. 1. In general, the pathways may provide for conversion of uplink signals received by the satellite into downlink signals. Each of the pathways may include a receiver (Rx) and by a transmitter (Tx). The receiver may include an LNA, and the transmitter may include an HPA. The receiver and transmitter are not limited to these components, however, and may include other components as well. For example, in some embodiments the receiver and/or the transmitter may also include components that provide frequency conversion (e.g., a down converter), filtering, and the like. The specific components included in each pathway and the configuration of those components may vary depending on the particular application.

The satellite communication system may use a framed hub-spoke beam switched pathway access protocol, with time slots like a Satellite Switched Time-Division Multiple Access (SS/TDMA) scheme. However, each time slot of the frame may correspond to either forward link (gateway to user terminals) or return link (user terminals to gateway) traffic from a transmitting beam to a receiving beam—not just a single transmission from one terminal to another. During normal operation, continuous streams of frames are typically used to facilitate communications. Multiple terminals may be serviced during each time slot using well known multiplexing and multiple access techniques (e.g., Time-Division Multiplexing (TDM), Time-Division Multiple Access (TDMA), Frequency-Division Multiple Access (FDMA), Multi-Frequency Time-Division Multiple Access (MF-TDMA), Code-Division Multiple Access (CDMA), and the like).

Forward Pathways

FIG. 2A provides an example of a forward pathway in accordance with an embodiment. In this embodiment, a receiver may be configured to receive forward uplink signals from a gateway via a gateway beam feed (GW/U Feed). In forward operation, the gateway beam feed may receive signals from one or more gateway terminals (e.g., gateway terminal 115 of FIG. 1). The output of the receiver may be coupled to the input of a transmitter.

The transmitter is coupled to a transmit switch (Tx SW). The transmit switch may be used to control an output from the pathway. The transmit switch may be positioned after the transmitter of the pathway along a signal path. The transmit switch may dynamically switch the transmission signal between any one of N user beam feeds (User Feeds) or a gateway beam feed (GW/U Feed). Each of the N user beam feeds may provide signals to one or more user terminals (e.g., user terminals 130 of FIG. 1). The gateway beam feed may provide signals to user terminals that are located within the same spot beam coverage area as the gateway terminal (hence the designation "GW/U"). The set of beams that share a common transmit switch may be referred to as a transmit beam group. Although only a single gateway is shown in a hub-spoke spot beam group, in some embodiments, more than one gateway may be used.

The transmit switch may cycle between different switch positions according to a beam group transmit switching pattern to provide forward link capacity to output beams associated with each of the output beams feeds. The beam group transmit switching pattern may be a set of switch positions versus time during a frame.

The beam group transmit switching pattern may be stored in memory at a beam switch controller. The beam group transmit switching pattern may be uploaded to the beam switch controller using an uplink signal that may be in-band or out-of-band with other uplink signals. The fraction of time the transmit switch spends in each position may determine the forward link capacity provided to each beam. Flexible allocation of forward link capacity is accomplished by altering the amount of time the transmit switch spends at each position. The time allocation may be dynamic (e.g., varying with the hour of the day) to accommodate temporal variations of a load in each beam.

As indicated in FIG. 2A, the transmit switch may be a fast switch (capable of switching rapidly, e.g., relative to a frame described further below). The switch may operate at radio frequency (RF) such as Ka band frequencies. In some embodiments, a ferrite switch may be used for the transmit switch. Ferrite switches may provide fast switching, low insertion loss (e.g., do not adversely impact equivalent isotropically radiated power (EIRP) or gain-to-noise-temperature (G/T)), and high power handling capabilities.

Return Pathways

FIG. 2B provides an example of a return pathway in accordance with an embodiment. In this embodiment, a receive switch may select between any one of N user beam feeds (User Feeds) or a gateway beam feed (GW/U Feed). Each of the N user beam feeds may include return signals from one or more user terminals (e.g., user terminals 130 of FIG. 1). The gateway beam feed may include return signals from user terminals that are located within the same spot beam coverage area as the gateway terminal (hence the designation "GW/U")). The receive switch (Rx SW) output may be coupled to the pathway receiver. The receive switch may be before the receiver of the pathway along a signal path. The set of beams that share a common receive switch may be referred to as a receive beam group.

Some embodiments may include one or more LNAs before the receive switch. For example, each input beam feed may have an associated LNA with the receive switch positioned after the LNA. Alternatively, a summer may be used to combine outputs from the LNAs, and the LNAs may be switched on and off to implement the switching function of the receive switch.

The embodiment shown in FIG. 2B may also include a transmitter configured to provide return downlink signals to a gateway beam feed (GW/U Feed). In the return operation, the gateway beam feed may include signals to one or more gateway terminals (e.g., gateway terminal 115 of FIG. 1).

The receive switch may cycle between different switch positions according to a beam group receive switching pattern to provide return link capacity to input beams associated with each of the input beams feeds. The operation and control (using a beam switch controller) of the receive switch may be similar to that of the transmit switch discussed above.

Forward/Return Pathways

FIG. 2C provides an example of a forward/return pathway in accordance with an embodiment. In this embodiment, a receiver may be coupled to a receive switch (Rx SW), and a transmitter may be coupled to a transmit switch (Tx SW). The receive switch may be used to control the input to the pathway, and the transmit switch may be used to control the output from the pathway. The set of beams that share transmit and receive switches may be referred to as a beam group.

As discussed previously, forward link operation may be obtained by connecting the receive switch to the gateway beam feed and cycling the transmit switch through the output switch positions. Return link operation may be obtained by connecting the transmit switch to the gateway beam feed and cycling the receive switch through the input switch positions. According to an embodiment of the invention, the beam group switching patterns of the pathway shown in FIG. 2C may be arranged such that a portion of a frame is dedicated to forward link operation, while another portion of the same frame is dedicated to return link operation.

In some embodiments, the beam group switching patterns may be the same from frame-to-frame (repeated in each of a plurality of consecutive frames), while in other embodiments, the beam group switching patterns may be changed from frame-to-frame. In yet other embodiments, a particular beam group switching pattern may be used for a particular time duration while another beam group switching pattern may be used for a different time duration (e.g., different times of the day, different days of the week, or the like). Many variations, modifications, and alternatives of switching patterns may be used within the embodiments disclosed herein. Whether the beam group switching patterns remain the same or changes may depend on a desired capacity allocation amongst beams and/or a desired ratio between forward and return capacity.

Gateway Switch Group

Figure 3:
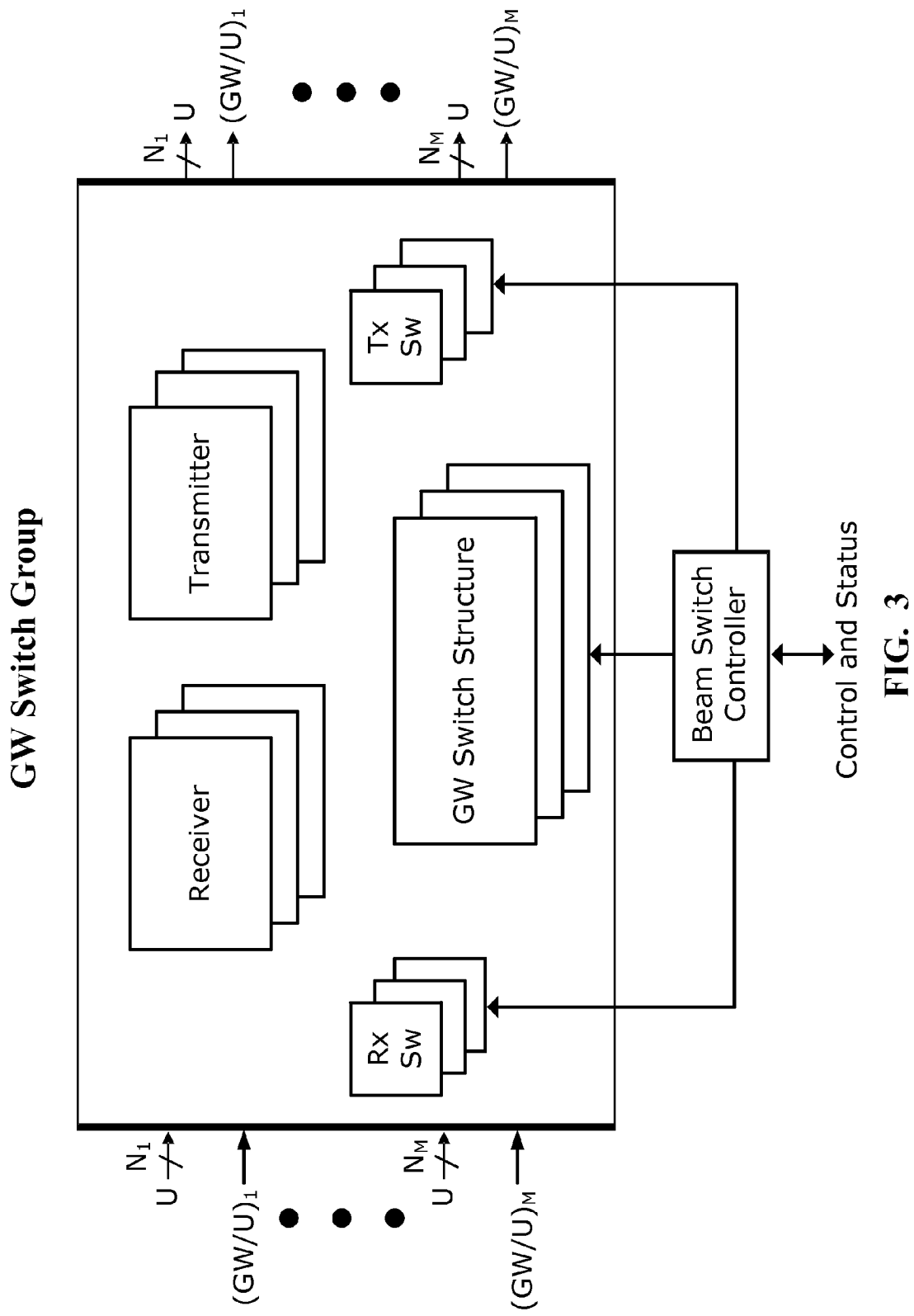
FIG. 3 is a simplified block diagram of example hardware that services a GW switch group in accordance with an embodiment of the present invention.

Recall that the set of beams that share transmit and receive switches may be referred to as a beam group. Beam groups may be further aggregated into what may be referred to as a gateway (GW) switch group. FIG. 3 is a simplified block diagram of example hardware that services a GW switch group in accordance with an embodiment of the present invention. The hardware may correspond to at least some of the K pathways shown in FIG. 1. In accordance with an embodiment, a hub-spoke satellite may service a number of GW switch groups, each with a number of receivers, transmitters, receiver switches, transmitter switches and a GW switch structure. The switches may be controlled by a beam switch controller as discussed previously.

The GW switch structure generally provides switching capability between inputs and outputs within the GW switch group. Possible inputs and outputs of the GW switch structure include one or more of the following: (a) the inputs may be uplink signals and the outputs may be input signals to receive switches; (b) the inputs may be output signals from receivers and the outputs may be input signals to transmitters; and (c) the inputs may be output signals from transmit switches and the outputs may be downlink signals.

As shown in FIG. 3, an embodiment includes receive switches (Rx SW) and transmit switches (Tx SW) that are associated with the GW switch group. Each receive and transmit switch in a beam group may service the same or a different number of user beams (hence the designations "$N_1$" through "$N_M$"). Both receive and transmit switches may be used in this embodiment to provide forward and return capability similar to the forward/return pathway of FIG. 2C. Some embodiments may include only transmit switches to provide forward link capability as in FIG. 2A. Some embodiments may include only receive switches to provide return link capability as in FIG. 2B.

Each receive and transmit switch is associated with a beam group and may provide switching between a gateway beam feed (GW/U) and a number of user beam feeds (U) as described previously. The GW switch structure, on the other hand, may provide switching between input signals associated with one beam group and output signals associated with another beam group. For example, a forward uplink signal from the gateway beam feed $(GW/U)_1$ may be received at the receive switch $Rx\ SW_1$ and passed through the associated circuitry to the transmit switch $Tx\ SW_1$. From the transmit switch $Tx\ SW_1$ the signal may be output to any of the user beam feeds associated with that beam group. Using the receive and transmit switches in concert with the GW switch structure, however, a forward uplink signal from one gateway beam feed $(GW/U)_1$ may be switched to the transmit switch associated with another beam depending on the GW switch structure position. Depending on the GW switch structure capability, the signal may be able to be output to any user beam feed associated with any of the beam groups in the GW switch group.

As the positions of the receive and transmit switches may be described by beam group switching patterns, the positions of the GW switch structure may be described by gateway switching patterns. The receive and transmit beam group switching patterns may be synchronized with the gateway switching pattern to provide sequential beam switching during a frame. The beam switch controller that implements the beam group switching patterns on the receive and transmit switches may also implement the gateway switching patterns on the GW switch structure.

The components shown in FIG. 3 may be used to implement incremental gateway deployment in accordance with an embodiment of the invention. Incremental gateway deployment may span at least two time periods. A first time period during which there are fewer gateway terminals than beam groups (prior to a time T) is followed by a second time period during which at least one additional gateway terminal has been added (after time T).

During the first time period, at least P of the receivers may receive a different one of at least P forward link signals from P gateway terminals GW/U (where P is a non-zero positive integer). During a frame, the GW switch structure may sequentially switch the at least P forward link signals from the P gateway terminals to provide the at least P forward link signals to the transmit switches. The at least P forward link signals are provided to the transmit switches according to a first gateway switching pattern, and each of the at least P forward link signals is sequentially switched into fixed location beams according to a first beam group transmit switching pattern.

During the second time period, at least Q of the receivers may receive a different one of at least Q forward link signals from Q gateway terminals GW/U (where Q is a non-zero positive integer and is greater than P). During a frame, the GW switch structure may sequentially switch the at least Q forward link signals from the Q gateway terminals to provide the at least Q forward link signals to the transmit switches. The at least Q forward link signals are provided to the transmit switches according to a second gateway switching pattern, and each of the at least Q forward link signals is sequentially switched into fixed location beams according to a second beam group transmit switching pattern.

Gateway terminals may transmit forward link signals to the satellite using a single polarization or more than one polarization (e.g., right hand circular polarized (RHCP) and left hand circular polarized (LHCP)). Using more than one polarity may increase capacity and decrease interference. Referring to the example, in some embodiments the at least P receivers may consist of exactly P receivers and the P gateway terminals may each transmit one signal on a single polarization. In other embodiments, the at least P receivers may consist of exactly 2*P receivers and the P gateway terminals may each transmit two signals on two different polarizations.

This embodiment has discussed a forward traffic embodiment. Similar techniques may be used for return traffic, and for combined forward/return traffic.

Switch Matrix Groups

Figure 4:
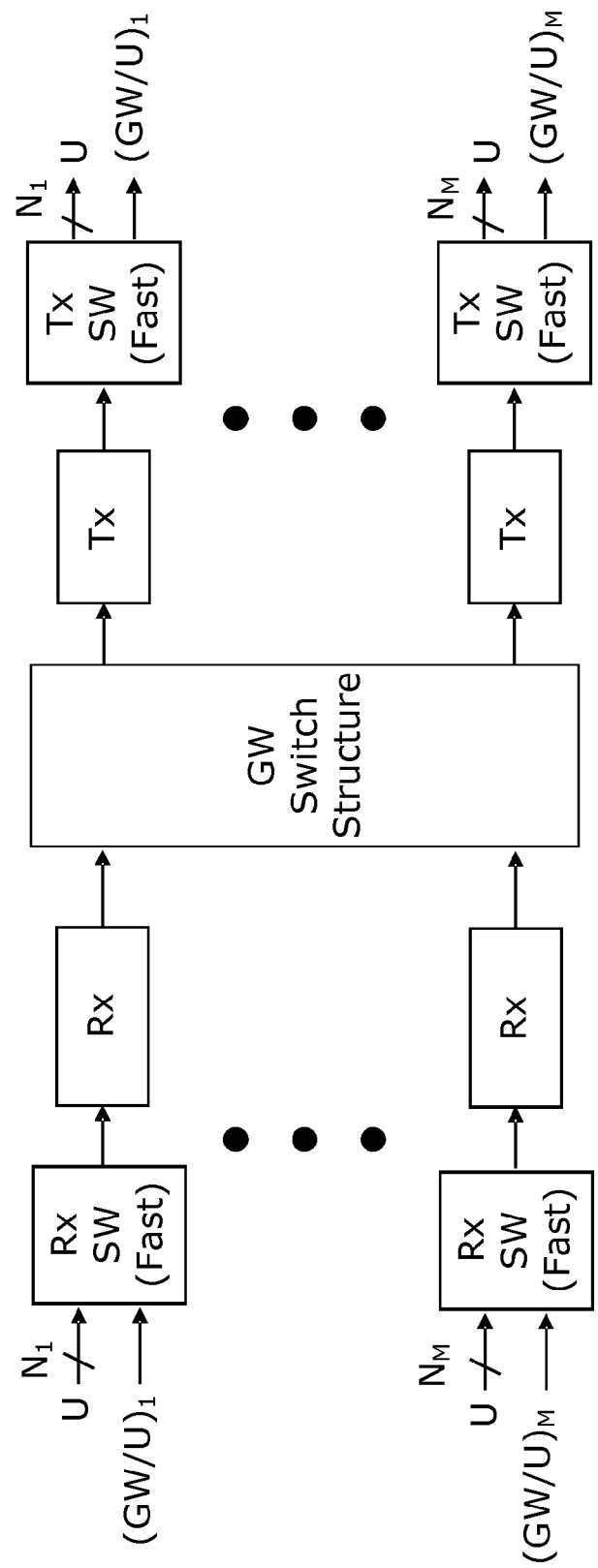
FIG. 4 is a simplified block diagram of a GW switch group embodiment, employing a switch matrix to provide incremental gateway deployment for forward and return link capability at a hub-spoke satellite in accordance with an embodiment of the present invention.

FIG. 4 is a simplified block diagram of a GW switch group embodiment, employing a switch matrix to provide incremental gateway deployment for forward and return link capability at a hub-spoke satellite in accordance with an embodiment of the present invention. This embodiment shows a GW switch group that includes M pathways with M receivers (Rx) and M transmitters (Tx). The hardware may correspond to M of the K pathways shown in FIG. 1 (M<K). Receive antenna feeds, beam switch controller, etc. shown in previous figures and described previously are not shown in this embodiment to avoid unnecessarily cluttering the figure. An M×M switch matrix may provide the GW switch structure in this embodiment. The M×M switch matrix may be configured to direct an output signal from any one of the M receivers to an input of any one of the M transmitters. A switch matrix may be implemented by an array of low mass solid state switches with hybrids.

In an example of the capability provided by a switch matrix, an input signal received at the receive switch (Rx SW) on the upper left of FIG. 4 may be output from the transmit switch (Tx SW) on the upper right of FIG. 4 or from the transmit switch on the lower right of FIG. 4 depending on the setting of the M×M switch matrix.

As shown in FIG. 4, fixed location beams associated with each receive switch and each transmit switch may include N user beams (U) and a gateway beam (GW/U). Feeds (such as the N User Feeds and the GW/U feeds shown in FIG. 2B) may be coupled to inputs of each receive switch shown in FIG. 4. Signals from the fixed location beams are passed from these feeds to the receive switches. Feeds (such as the N User Feeds and the GW/U feeds shown in FIG. 2A) may be coupled to outputs of each transmit switch shown in FIG. 4. Signals to the fixed location beams are passed from the transmit switches to these feeds. Note that each receive switch (or each transmit switch) may service the same number of user beams or a different number of user beams (hence the designations "$N_1$" and "$N_M$"). The receive switches and the transmit switches may be configured for fast switching as described above.

In a first mode of operation, the M×M switch matrix may be fixed to pass signals directly through from left to right, such that the signals to and from each gateway terminal will take a similar path to that shown in FIG. 2C. In this mode of operation, each gateway terminal may provide capacity only to users in its beam group. In other modes of operation, the M×M switch matrix may synchronize its switching pattern to the receive and transmit beam group switching patterns. Thus, the service slots from one gateway may be allocated to any beam within the GW switch group, regardless of beam group association.

To understand use of the switch matrix in a gateway deployment, an example of an incremental gateway deployment will be described. Initially, a first gateway terminal GW1 is the only gateway terminal deployed. It is associated with $N_1$ user beams U and one combined gateway and user beam $(GW/U)_1$. Here, P=1. Since the gateway terminal GW1 is the only gateway terminal that is initially deployed, it cannot provide service to users associated with other gateways if the first mode of switch matrix operation described above is employed. The switch matrix may be controlled, however, to sequentially switch an output from the single receiver associated with the gateway terminal GW1 to inputs of transmitters associated with all the other gateway terminals in the GW switch group. This is for forward traffic slots. For return traffic slots, the M×M switch matrix may be controlled to sequentially switch outputs from each of the M receivers to the input of the single transmitter associated with gateway terminal GW1. Thus, the capacity provided by the gateway terminal GW1 may be allocated across all beams in the GW switch group as desired.

Continuing with this example, at a later time (after a time T) another M-2 gateway terminals are deployed such that only $GW_M$ is not operational. Now, P=M-1. In this scenario, the M×M switch matrix may be controlled to sequentially switch outputs from the first M-1 receivers to inputs of all the transmitters (for forward traffic slots). For return traffic slots, the switch matrix may be controlled to sequentially switch outputs from each of the M receivers to inputs of the first M-1 transmitters. Thus, the capacity provided by the first M-1 gateway terminals may be allocated across all user beams in the GW switch group as desired.

Outer Switch Groups

Figure 5:
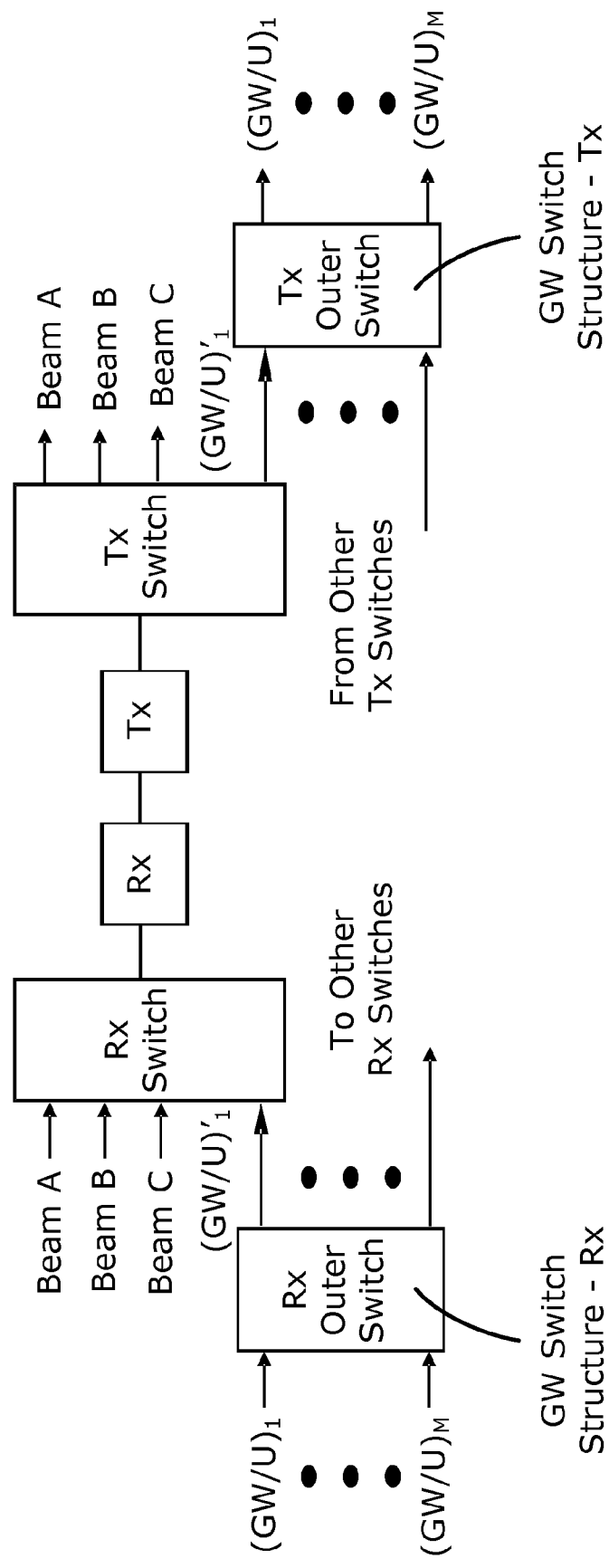
FIG. 5 is a simplified block diagram of a GW switch group embodiment using an outer switch structure that may be used to provide incremental gateway deployment for forward and return link capability at a hub-spoke satellite in accordance with an embodiment of the present invention.

FIG. 5 is a simplified block diagram of a GW switch group embodiment using an outer switch structure that may be used to provide incremental gateway deployment for forward and return link capability at a hub-spoke satellite in accordance with an embodiment of the present invention. This embodiment uses a hardware pathway that includes a receiver (Rx) and a transmitter (Tx). As explained above, the receiver may include an LNA, and the transmitter may include a HPA. The pathway may correspond to one of the K pathways shown in FIG. 1. Receive antenna feeds, beam switch controller, etc. shown in previous figures and described above are not shown in this embodiment to avoid unnecessarily cluttering the figure.

In this embodiment, the receiver is coupled to a receive switch (Rx Switch), and the receive switch is coupled to a receive-side outer switch (Rx Outer Switch). The receive switch may sequentially switch signals from fixed location beams into a receiver according to a beam group receive switching pattern. The fixed location beams in this embodiment include three user beams (Beam A, Beam B, Beam C) and a gateway beam $(GW/U)_1$. The receive-side outer switch may sequentially switch signals from fixed location gateway beams $(GW/U)_1$ to $(GW/U)_M$ into an input $(GW/U)'_1$ of the receive switch for the pathway according to a gateway switching pattern. Each of the gateway beams may also service user terminals that are located within the gateway beams. The receive-side outer switch may be coupled to other pathways through other receive switches as indicated by arrows extending from the right-side of the receive-side outer switch.

The transmitter is coupled to a transmit switch (Tx Switch), and the transmit switch is coupled to a transmit-side outer switch (Tx Outer Switch). The transmit switch may sequentially switch signals into fixed location beams according to a beam group transmit switching pattern. The fixed location beams in this embodiment include three user beams (Beam A, Beam B, Beam C) and a gateway beam $(GW/U)_1$. The transmit-side outer switch may sequentially switch signals from an output $(GW/U)'_1$ of the transmit switch for the gateway beam into fixed location gateway beams $(GW/U)_1$ to $(GW/U)_M$ according to a gateway switching pattern. Each of the gateway beams may also service user terminals that are located within the gateway beams. The transmit-side outer switch may be coupled to other pathways through transmit switches as indicated by arrows pointing into the left side of the transmit-side outer switch.

The GW switch structure in this embodiment may comprise the receive-side outer switch (forward traffic), the transmit-side outer switch (return traffic), or both (forward and return traffic). The receive-side outer switch and the transmit-side outer switch may be used in tandem to enable forward and return incremental gateway deployment in a manner similar to that described previously.

Figure 6:
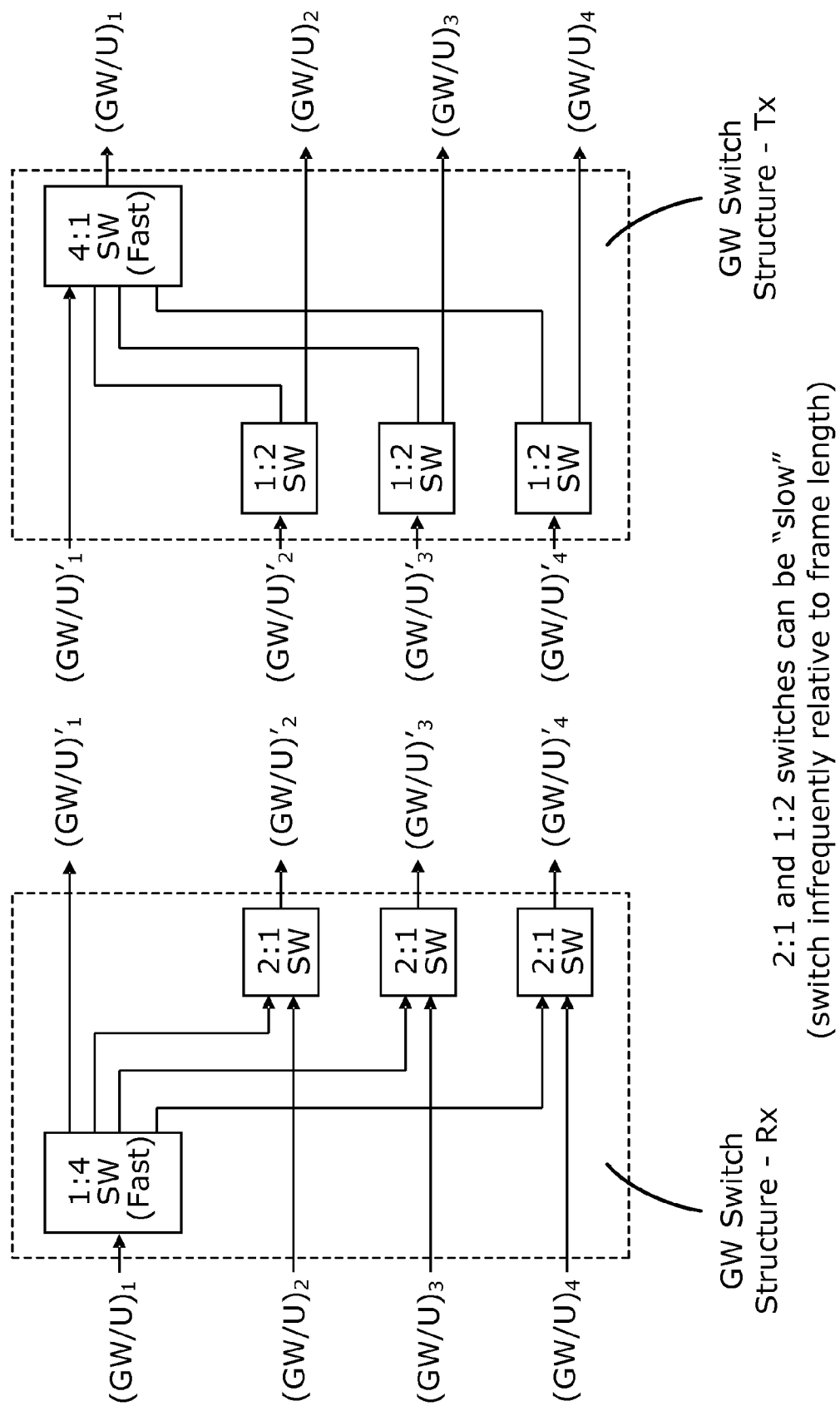
FIGS. 6-8 are simplified block diagrams of various outer switch networks embodiments that may be used to enable incremental gateway deployment for forward and return link capability at a hub-spoke satellite in accordance with some embodiments of the present invention.

FIG. 6 is a simplified block diagram of a first outer switch networks embodiment that may be used to enable incremental gateway deployment for forward and return link capability at a hub-spoke satellite in accordance with an embodiment of the present invention. The outer switch networks (GW switch structure) in this embodiment may include receive-side outer switches (forward traffic), transmit-side outer switches (return traffic), or both (forward and return traffic). Signals from a first input gateway beam $(GW/U)_1$ may be switched between pathways associated with any of the output gateway beams $(GW/U)_1$, $(GW/U)_2$, $(GW/U)_3$, and $(GW/U)_4$. This allows capacity from a gateway terminal GW1 located within the first gateway beam $(GW/U)_1$ to be shared amongst user beams associated with output gateway beams $(GW/U)_1$, $(GW/U)_2$, $(GW/U)_3$, and $(GW/U)_4$.

This embodiment shows a first layer 1:4 receive-side outer switch configured to switch signals associated with the first input gateway beam $(GW/U)_1$. One output of the 1:4 receive-side outer switch is labeled $(GW/U)'_1$ and goes to the $(GW/U)'_1$ input of the receive switch of FIG. 5, while the other three outputs become inputs to second layer 2:1 receive-side outer switches, each of which is configured to switch between the $(GW/U)_1$ signal and a signal from one of the other input gateway beams $(GW/U)_2$, $(GW/U)_3$, and $(GW/U)_4$. Outputs of each of the 2:1 receive-side outer switches labeled $(GW/U)'_2$, $(GW/U)'_3$, and $(GW/U)'_4$ are coupled to the pathways associated with the respective gateways.

The 2:1 receive-side outer switches and 1:2 transmit-side outer switches shown in FIG. 6 may be configured for fast switching or "slow" switching if, for example, they only switch when an associated gateway is deployed, which is infrequent compared to the time duration of a frame. The Rx network may be low power and low loss. The Tx network may be high power and low loss.

As an example, if the gateway terminal GW1 located in the first gateway beam $(GW/U)_1$ is the only gateway terminal deployed, the 1:4 and 4:1 outer switches shown in FIG. 6 may sequentially switch between each pathway (each associated with a beam group) during a frame. Since there are four pathways in this embodiment (one associated with each of the gateway beams $(GW/U)_1$, $(GW/U)_2$, $(GW/U)_3$, and $(GW/U)_4$), each pathway may receive an average of 25% of the capacity from the gateway terminal GW1 located in the first gateway beam $(GW/U)_1$. The actual capacity for each pathway may vary since the switches allow flexible allocation of capacity as needed.

If gateway terminals GW1 and GW2 located in the first and second gateway beams $(GW/U)_1$ and $(GW/U)_2$ are the only gateway terminals deployed, the pathway associated with the second gateway beam $(GW/U)_2$ may receive 100% of the capacity from the gateway terminal GW2 located in the second gateway beam $(GW/U)_2$. The pathways associated with the gateway beams $(GW/U)_1$, $(GW/U)_3$, and $(GW/U)_4$ may each receive an average of 33% of the capacity from the gateway terminal GW1 located in the first gateway beam $(GW/U)_1$, by using the 1:4 and 4:1 outer switches to sequentially switch between the three corresponding pathways during a frame.

If gateway terminals GW1, GW2, and GW3 located in the first, second, and third gateway beams $(GW/U)_1$, $(GW/U)_2$, and $(GW/U)_3$ are the only gateway terminals deployed, the pathways associated with the second and third gateway beams $(GW/U)_2$ and $(GW/U)_3$ may each receive 100% of the capacity from their respective gateway terminals GW2 and GW3 located in the second and third gateway beams $(GW/U)_2$ and $(GW/U)_3$. The pathways associated with the gateway beams $(GW/U)_1$ and $(GW/U)_4$ may each receive an average of 50% of the capacity from the gateway terminal GW1 located in the first gateway beam $(GW/U)_1$, by using the 1:4 and 4:1 outer switches to sequentially switch between the two corresponding pathways during a frame.

Once gateway terminals GW1, GW2, GW3, and GW4 located in each of the gateway beams $(GW/U)_1$, $(GW/U)_2$, $(GW/U)_3$, and $(GW/U)_4$ are deployed, the pathway associated with each of the gateway beams $(GW/U)_1$, $(GW/U)_2$, $(GW/U)_3$, and $(GW/U)_4$ may receive 100% of the capacity from their respective gateway terminals.

The 1:4 receive-side outer switch and the 4:1 transmit-side outer switch are used in this embodiment to provide switching for the four pathways. In general, a 1:R receive-side outer switch and a R:1 transmit-side outer switch may be used in accordance with this embodiment to provide switching for R pathways.

Figure 7:
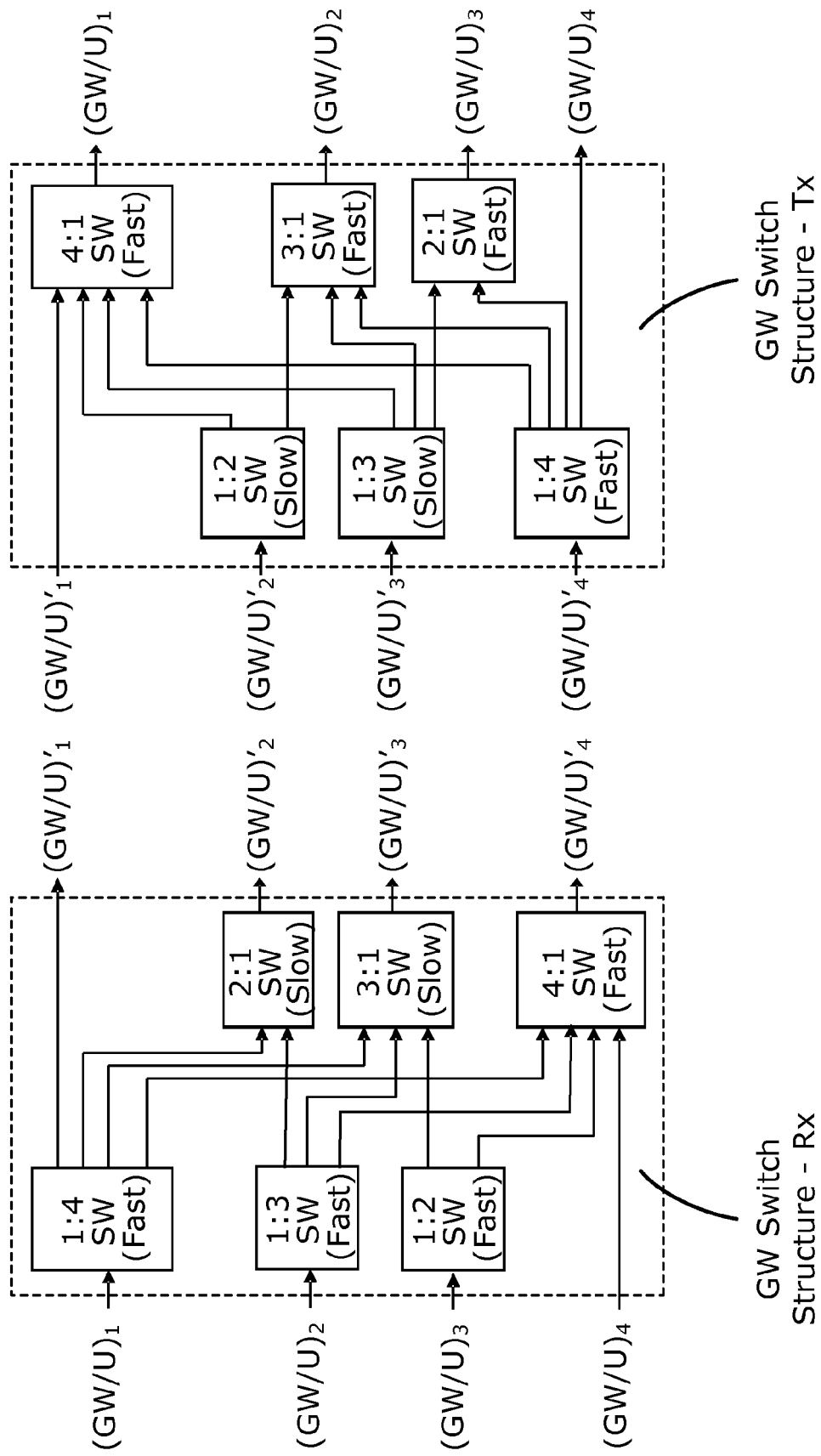

FIG. 7 is a simplified block diagram of a second outer switch networks embodiment that may be used to enable incremental gateway deployment for forward and return link capability at a hub-spoke satellite in accordance with an embodiment of the present invention. This embodiment features more switches than the first outer switch networks embodiment, but it allows for a uniform distribution of capacity as the gateways are deployed. The outer switch networks (GW switch structure) in this embodiment may include receive-side outer switches (forward traffic), transmit-side outer switches (return traffic), or both (forward and return traffic). In some embodiments, this allows capacity to be shared between any of the gateway beams $(GW/U)_1$-$(GW/U)_4$ and amongst user beams associated with output gateway beams $(GW/U)_1$-$(GW/U)_4$.

This embodiment shows a first layer (or bank) of receive-side outer switches that include 1:4, 1:3, 1:2 switches and a second layer (or bank) of receive-side outer switches that include 2:1, 3:1, 4:1 switches. In general, 1:R, 1:(R−1), . . . 1:2 switches may be used for the first layer of receive-side outer switches, and R:1, (R−1):1, . . . 2:1 switches may be used for the second layer of receive-side outer switches, for R pathways. The Rx network may be low power and low loss. The Tx network may be high power and low loss.

This embodiment also shows a first layer of transmit-side outer switches that include 4:1, 3:1, 2:1 switches and second layer of transmit-side outer switches that include 4:1, 3:1, 2:1 switches. In general, 1:R, 1:(R−1), . . . 1:2 switches may be used for the first layer of transmit-side outer switches, and R:1, (R−1):1, . . . 2:1 switches may be used for the second layer of transmit-side outer switches, for R pathways.

The first layer of receive-side outer switches may be configured for fast switching as described above. The second layer of receive-side outer switches may be configured for fast switching or some of them may be configured for slow switching if, for example, they only switch when an associated gateway is deployed, which is infrequent compared to the time duration of a frame.

As an example, if a gateway terminal GW1 located in a first gateway beam $(GW/U)_1$ is the only gateway terminal deployed, the outer switches shown in FIG. 7 may sequentially switch between beam groups associated with each pathway. Since there are four pathways in this embodiment (one associated with each of the gateway beams $(GW/U)_1$, $(GW/U)_2$, $(GW/U)_3$, and $(GW/U)_4$), each pathway may receive an average of 25% of the capacity from the gateway terminal GW1 located in the first gateway beam $(GW/U)_1$. The actual capacity for each pathway may vary since the switches allow flexible allocation of capacity as needed. For example, with only the first gateway terminal GW1 deployed, user beams associated with the first gateway terminal GW1 and user beams associated with just one other gateway terminal may need service. In that case, the capacity from the first gateway terminal GW1 would be allocated amongst only those beams and not the remaining beams associated with other gateways terminals.

If gateway terminals GW1 and GW2 located in the first and second gateway beams $(GW/U)_1$ and $(GW/U)_2$ are the only gateway terminals deployed, the pathways associated with the second and third gateway beams $(GW/U)_2$ and $(GW/U)_3$ may each receive an average of 50% of the capacity from the gateway terminal GW2 located in the second gateway beam $(GW/U)_2$ by setting the slow 2:1, 3:1 and 1:2, 1:3 switches to the signals corresponding to the second gateway beam $(GW/U)_2$ and having the first layer 1:3 receive-side outer switch sequentially switch between the pathways corresponding to $(GW/U)_2$ and $(GW/U)_3$. The pathways associated with the gateway beams $(GW/U)_1$ and $(GW/U)_4$ may each receive an average of 50% of the capacity from the gateway terminal GW1 located in the first gateway beam $(GW/U)_1$ using similar techniques. Note that the gateway terminal GW2 located in the second gateway beam $(GW/U)_2$ may alternatively service the user terminals from the beam group of the fourth gateway beam $(GW/U)_4$.

If gateway terminals GW1, GW2, and GW3 located in the first, second, and third gateway beams $(GW/U)_1$, $(GW/U)_2$, and $(GW/U)_3$ are the only gateway terminals deployed, the pathways associated with the gateway beams $(GW/U)_1$, $(GW/U)_2$, $(GW/U)_3$, and $(GW/U)_4$ may each receive an average of 75% of pathway capacity. By sequential switching as discussed above, gateway terminals GW1, GW2, and GW3 located in the first, second, and third gateway beams $(GW/U)_1$, $(GW/U)_2$, and $(GW/U)_3$ may each provide 75% of their capacity to the pathways associated with their respective gateway beams and 25% of their capacity to the pathway associated with the fourth gateway beam $(GW/U)_4$. The 4:1 switch in the second layer of receive-side outer switches and the 1:4 switch in the second layer of transmit-side outer switches may be configured for fast switching to receive signals from each of the first, second, or third gateway beams $(GW/U)_1$, $(GW/U)_2$, and $(GW/U)_3$ during a frame.

If gateway terminals GW1, GW2, GW3, and GW4 located in each of the gateway beams $(GW/U)_1$, $(GW/U)_2$, $(GW/U)_3$, and $(GW/U)_4$ are deployed, the pathway associated with each of the gateway beams $(GW/U)_1$, $(GW/U)_2$, $(GW/U)_3$, and $(GW/U)_4$ may receive 100% of the capacity from their respective gateway terminals. If fast switches are employed for all the switches in the second outer switch networks, however, any gateway may provide any fraction of its capacity to any other beam by proper scheduling of the switches.

Figure 8:
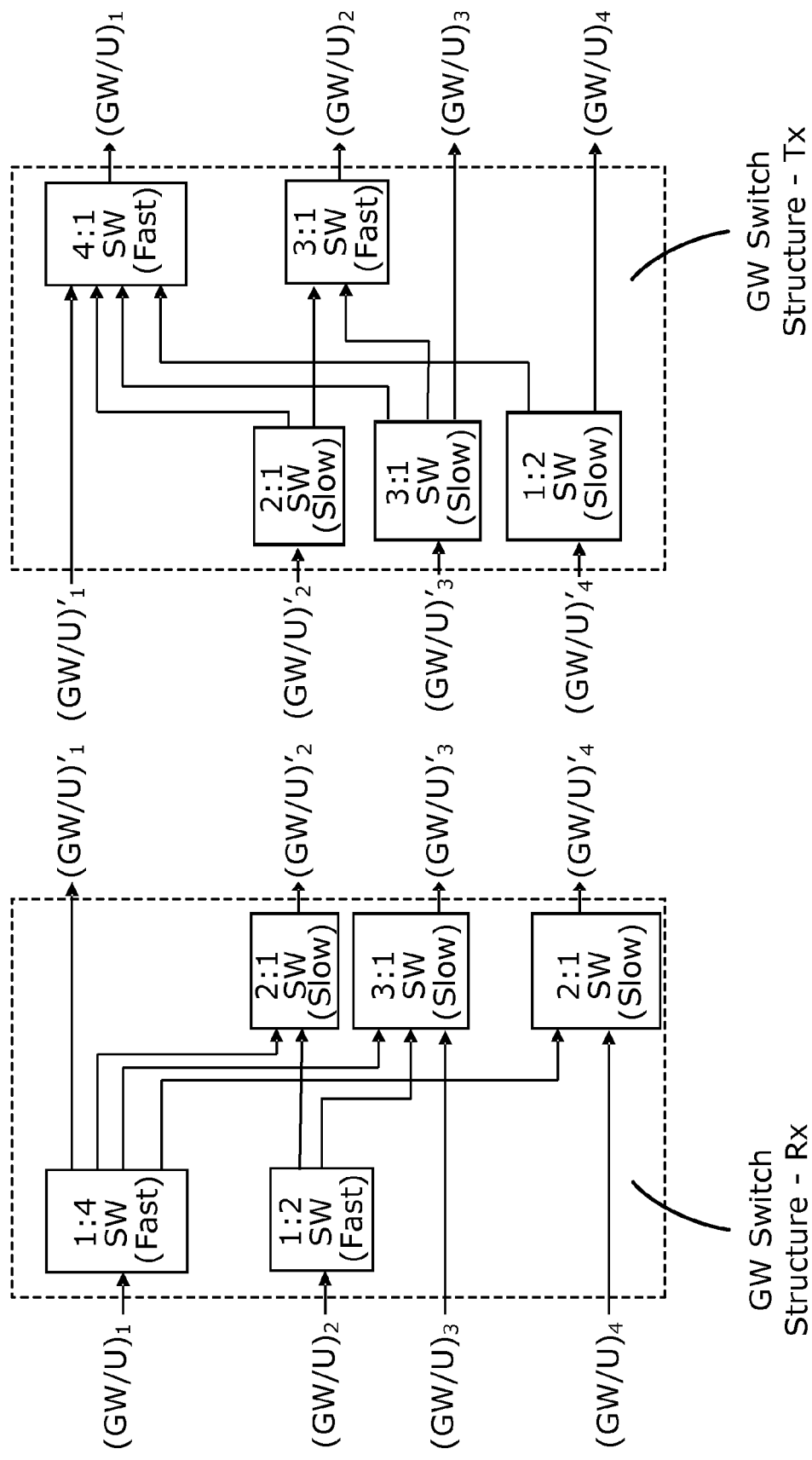

FIG. 8 is a simplified block diagram of a third outer switch networks embodiment that may be used to enable incremental gateway deployment for forward and return link capability at a hub-spoke satellite in accordance with an embodiment of the present invention. This embodiment features more switches than the first outer switch networks embodiment, and it provides a more uniform distribution of capacity as the gateways are deployed. This embodiment features less switches than the second outer switch networks embodiment, and it provides a less uniform distribution of capacity as the gateways are deployed. It may be considered a compromise between implementation complexity and flexibility. The outer switch networks (GW switch structure) in this embodiment may include receive-side outer switches (forward traffic), transmit-side outer switches (return traffic), or both (forward and return traffic). In some embodiments, this allows capacity to be shared between any of the gateway beams $(GW/U)_1$-$(GW/U)_4$ and amongst user beams associated with output gateway beams $(GW/U)_1$-$(GW/U)_4$.

This embodiment shows a first layer of receive-side outer switches that include 1:4 and 1:2 switches and a corresponding first layer of transmit-side outer switches that include 4:1 and 2:1 switches. This embodiment also shows a second layer of receive-side outer switches that include 2:1, 3:1, and 2:1 switches and a corresponding second layer of transmit-side outer switches that include 1:2, 1:3, and 1:2 switches.

The first layer of switches may be configured for fast switching as described above. The second layer of switches may be configured for fast switching or slow switching if, for example, they only switch when an associated gateway is deployed, which is infrequent compared to the time duration of a frame. The Rx network may be low power and low loss. The Tx network may be high power and low loss.

As an example, if a gateway terminal GW1 located in the first gateway beam $(GW/U)_1$ is the only gateway terminal deployed, the outer switches shown in FIG. 8 may switch between beam groups associated with each pathway. Since there are four pathways in this embodiment (one associated with each of the gateway beams $(GW/U)_1$, $(GW/U)_2$, $(GW/U)_3$, and $(GW/U)_4$), each pathway will receive an average of 25% of the capacity from the gateway terminal GW1 located in the first gateway beam $(GW/U)_1$. The actual capacity for each pathway may vary since the switches allow flexible allocation of capacity as needed.

If gateway terminals GW1 and GW2 located in the first and second gateway beams $(GW/U)_1$ and $(GW/U)_2$ are the only gateway terminals deployed, the pathway associated with the second and third gateway beams $(GW/U)_2$ and $(GW/U)_3$ may each receive an average of 50% of the capacity from the gateway terminal GW2 located in the second gateway beam $(GW/U)_2$ by setting the slow 2:1, 3:1 and 1:2, 1:3 switches to the signals corresponding to the second gateway beam $(GW/U)_2$ and having the first layer 1:2 receive-side outer switch sequentially switch between the pathways corresponding to $(GW/U)_2$ and $(GW/U)_3$. The pathways associated with the gateway beams $(GW/U)_1$ and $(GW/U)_4$ may each receive an average of 50% of the capacity from the gateway terminal GW1 located in the first gateway beam $(GW/U)_1$ using similar techniques. Note that the gateway terminal GW2 located in the second gateway beam $(GW/U)_2$ may alternatively service the user terminals from the beam group of the fourth gateway beam $(GW/U)_4$.

If gateway terminals GW1, GW2, and GW3 located in the first, second, and third gateway beams $(GW/U)_1$, $(GW/U)_2$, and $(GW/U)_3$ are the only gateway terminals deployed, the pathways associated with the gateway beams $(GW/U)_2$ and $(GW/U)_3$ may each receive 100% of the capacity from their respective gateway terminals located in the second and third gateway beams GW2 and GW3 by setting their slow switches to their corresponding gateway beams $(GW/U)_2$ and $(GW/U)_3$ in a similar manner to the corresponding case in the first outer switch networks implementation. The pathways associated with the gateway beams $(GW/U)_1$ and $(GW/U)_4$ may each receive an average of 50% of the capacity from the gateway terminal GW1 located in the first gateway beam $(GW/U)_1$ by setting the slow switches for the $(GW/U)_4$ beam group to the signal from gateway beams $(GW/U)_1$ and having the first layer 1:4 receive-side outer switch sequentially switch between the two pathways corresponding to $(GW/U)_1$ and $(GW/U)_4$.

If gateway terminals GW1, GW2, GW3, and GW4 located in each of the gateway beams $(GW/U)_1$, $(GW/U)_2$, $(GW/U)_3$, and $(GW/U)_4$ are deployed, the pathway associated with each of the gateway beams $(GW/U)_1$, $(GW/U)_2$, $(GW/U)_3$, and $(GW/U)_4$ may receive 100% of the capacity from their respective gateway terminals.

An example of a means for receiving the forward link signals from the gateway terminals is the receivers. An example of a means for sequentially switching the forward link signals from the gateway terminals in the duration of one frame to provide the forward link signals to the transmit switches is the GW switch structure. An example of a means for sequentially switching the forward link signals into fixed location beams according to a beam group transmit switching pattern is the transmit switches.

Embodiments of the present invention are not limited to the examples shown or described herein. For example, embodiments of the present invention may involve any number of receive-side outer switches, receive switches, pathways, transmit switches, and transmit-side outer switches. Also, while the above embodiments have been explained with regard to an incremental gateway deployment, the same steps may be followed in opposite order when decommissioning gateway terminals. Furthermore, features of one or more embodiments may be combined with features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. A method for communicating using a hub-spoke satellite having a forward link capability comprising:
    providing the hub-spoke satellite, the hub-spoke satellite comprising a plurality of receivers having inputs and outputs, a plurality of transmitters having inputs and outputs, the inputs of the plurality of transmitters coupled to the outputs of the plurality of receivers, a plurality of transmit switches coupled to the outputs of the plurality of transmitters, and a gateway switch structure coupled to one of: (a) the inputs of the plurality of receivers, and (b) the outputs of the plurality receivers and the inputs of the plurality of transmitters;
    using each transmit switch in the plurality of transmit switches to sequentially switch a forward link signal into multiple fixed location beams according to a beam group transmit switching pattern;
    prior to a time T, using each of at least P receivers in the plurality of receivers to receive a different one of at least P forward link signals from P gateway terminals, and in the duration of one frame, using the gateway switch structure to sequentially switch the at least P forward link signals from the P gateway terminals, in order to provide the at least P forward link signals to the plurality of transmit switches, according to a first gateway switching pattern, and sequentially switching each of the at least P forward link signals into fixed location beams according to a first beam group transmit switching pattern;
    after time T, using each of at least Q receivers in the plurality of receivers to receive a different one of at least Q forward link signals from Q gateway terminals, and in the duration of one frame, using the gateway switch structure to sequentially switch the at least Q forward link signals from the Q gateway terminals, in order to provide the at least Q forward link signals to the plurality of transmit switches, according to a second gateway switching pattern, and sequentially switching each of the at least Q forward link signals into fixed location beams according to a second beam group transmit switching pattern;
    wherein P and Q are both non-zero, positive integers, and Q>P; and
    wherein the first and second gateway switching patterns are different.

2. The method of claim 1, wherein the at least P receivers consist of exactly P receivers, and the P gateway terminals each transmit one signal on a single polarization.

3. The method of claim 1, wherein the at least P receivers consist of exactly 2*P receivers, and the P gateway terminals each transmit two signals on two different polarizations.

4. The method of claim 1, wherein the gateway switch structure comprises a switch matrix positioned between the plurality of receivers and the plurality of transmitters.

5. The method of claim 1, wherein the gateway switch structure comprises at least one receive-side outer switch positioned before the plurality of receivers.

6. The method of claim 5,
    wherein the plurality of receivers comprises R receivers, R being a non-zero, positive integer, and R>=Q>P;
    wherein the at least one receive-side outer switch comprises:
        one 1:R switch for receiving a first forward link signal, the 1:R switch associated with a first switching speed allowing switching within the duration of one frame; and
        a plurality of 2:1 switches, each for receiving (a) an output of the 1:R switch and (b) one of R−1 other forward link signals, each of the plurality of 2:1 switches associated with a second switching speed allowing switching at time T.

7. The method of claim 5,
    wherein the plurality of receivers comprises R receivers, R being a non-zero, positive integer, and R>=Q>P;
    wherein the at least one receive-side outer switch comprises:
        a first bank of switches, including 1:R, 1:(R−1), . . . , 1:2 switches, each associated with a first switching speed allowing switching within the duration of one frame;
        a second bank of switches following the first bank of switches, the second bank of switches including 2:1, 3:1, . . . , (R−1):1 switches, each associated with a second switching speed allowing switching at time T, the second bank of switches further including an R:1 switch associated with the first switching speed allowing switching within the duration of one frame.

8. The method of claim 5,
    wherein the plurality of receivers comprises R receivers, R being a non-zero, positive integer, and R>=Q>P;
    wherein the at least one receive-side outer switch comprises:
        a first bank of switches, including a 1:R switch and a 1:(R/2) switch, each associated with a first switching speed allowing switching within the duration of one frame;
        a second bank of switches following the first bank of switches, each associated with a second switching speed allowing switching at time T.

9. The method of claim 1, wherein each of the plurality of receivers comprises a low noise amplifier (LNA).

10. The method of claim 1, wherein each of plurality of transmitters comprises a high power amplifier (HPA).

11. The method of claim 1, wherein the first and second beam group transmit switching patterns are different.

12. The method of claim 1, wherein the first and second beam group transmit switching patterns are the same.

13. The method of claim 1, wherein the hub-spoke satellite has return link capability in addition to forward link capability and further comprises a plurality of receive switches coupled to the inputs of the plurality of receivers, the method further comprising:

wherein the gateway switch structure is coupled to one of: (a) the inputs of the plurality of receivers and the outputs of the plurality of transmitters, and (b) the outputs of the plurality receivers and the inputs of the plurality of transmitters;

using each receive switch in the plurality of receive switches to sequentially switch return link signals from fixed location beams into a receiver according to a beam group receive switching pattern;

prior to time T, sequentially switching the return link signals from multiple fixed location beams into the plurality of receivers according to a first beam group receive switching pattern, and in the duration of one frame, using the gateway switch structure to sequentially switch the return link signals to at least P transmitters in the plurality of transmitters according to the first gateway switching pattern, and using each of the at least P transmitters to transmit a different one of the return link signals to one of the P gateway terminals; and after time T, sequentially switching the return link signals from multiple fixed location beams into the plurality of receivers according to a second beam group receive switching pattern, and in the duration of one frame, using the gateway switch structure to sequentially switch the return link signals to at least Q transmitters in the plurality of transmitters according to the second gateway switching pattern, and using each of the at least Q transmitters to transmit a different one of the return link signals to one of the Q gateway terminals.

14. A satellite communication system having a forward link capability comprising:

a plurality of gateway terminals;

a plurality of user terminals;

a hub-spoke satellite for providing communications between the gateway terminals and the user terminals, the hub-spoke satellite comprising a plurality of receivers having inputs and outputs, a plurality of transmitters having inputs and outputs, the inputs of the plurality of transmitters coupled to the outputs of the plurality of receivers, a plurality of transmit switches coupled to the outputs of the plurality of transmitters, and a gateway switch structure coupled to one of: (a) the inputs of the plurality of receivers, and (b) the outputs of the plurality receivers and the inputs of the plurality of transmitters;

wherein each transmit switch in the plurality of transmit switches is configured to sequentially switch a forward link signal into multiple fixed location beams according to a beam group transmit switching pattern;

wherein prior to a time T, at least P receivers in the plurality of receivers are each configured to receive a different one of at least P forward link signals from P gateway terminals, and in the duration of one frame, the gateway switch structure is configured to sequentially switch the at least P forward link signals from the P gateway terminals, in order to provide the at least P forward link signals to the plurality of transmit switches, according to a first gateway switching pattern, and each of the at least P forward link signals is sequentially switched into fixed location beams according to a first beam group transmit switching pattern;

wherein after time T, at least Q receivers in the plurality of receivers are each configured to receive a different one of at least Q forward link signals from Q gateway terminals, and in the duration of one frame, the gateway switch structure is configured to sequentially switch the at least Q forward link signals from the Q gateway terminals, in order to provide the at least Q forward link signals to the plurality of transmit switches, according to a second gateway switching pattern, and each of the at least Q forward link signals is sequentially switched into fixed location beams according to a second beam group transmit switching pattern;

wherein P and Q are both non-zero, positive integers, and Q>P; and wherein the first and second gateway switching patterns are different.

15. The satellite communication system of claim 14, wherein the at least P receivers consist of exactly P receivers, and the P gateway terminals each transmit one signal on a single polarization.

16. The satellite communication system of claim 14, wherein the at least P receivers consist of exactly 2*P receivers, and the P gateway terminals each transmit two signals on two different polarizations.

17. The satellite communication system of claim 14, wherein the gateway switch structure comprises a switch matrix positioned between the plurality of receivers and the plurality of transmitters.

18. The satellite communication system of claim 14, wherein the gateway switch structure comprises at least one receive-side outer switch positioned before the plurality of receivers.

19. The satellite communication system of claim 18, wherein the plurality of receivers comprises R receivers, R being a non-zero, positive integer, and R>=Q>P;

wherein the at least one receive-side outer switch comprises:

one 1:R switch for receiving a first forward link signal, the 1:R switch associated with a first switching speed allowing switching within the duration of one frame; and a plurality of 2:1 switches, each for receiving (a) an output of the 1:R switch and (b) one of R−1 other forward link signals, each of the plurality of 2:1 switches associated with a second switching speed allowing switching at time T.

20. The satellite communication system of claim 18, wherein the plurality of receivers comprises R receivers, R being a non-zero, positive integer, and R>=Q>P;

wherein the at least one receive-side outer switch comprises:

a first bank of switches, including 1:R, 1:(R−1), . . . , 1:2 switches, each associated with a first switching speed allowing switching within the duration of one frame;

a second bank of switches following the first bank of switches, the second bank of switches including 2:1, 3:1, . . . , (R−1):1 switches, each associated with a second switching speed allowing switching at time T, the second bank of switches further including an R:1 switch associated with the first switching speed allowing switching within the duration of one frame.

21. The satellite communication system of claim 18, wherein the plurality of receivers comprises R receivers, R being a non-zero, positive integer, and R>=Q>P;

wherein the at least one receive-side outer switch comprises:

a first bank of switches, including a 1:R switch and a 1:(R/2) switch, each associated with a first switching speed allowing switching within the duration of one frame;

a second bank of switches following the first bank of switches, each associated with a second switching speed allowing switching at time T.

22. The satellite communication system of claim 14, wherein each of the plurality of receivers comprises a low noise amplifier (LNA).

23. The satellite communication system of claim 14, wherein each of plurality of transmitters comprises a high power amplifier (HPA).

24. The satellite communication system of claim 14, wherein the first and second beam group transmit switching patterns are different.

25. The satellite communication system of claim 14, wherein the first and second beam group transmit switching patterns are the same.

26. The satellite communication system of claim 14 having a return link capability in addition to forward link capability,
wherein the hub-spoke satellite further comprises a plurality of receive switches coupled to the inputs of the plurality of receivers;
wherein the gateway switch structure is coupled to one of: (a) the inputs of the plurality of receivers and the outputs of the plurality of transmitters, and (b) the outputs of the plurality receivers and the inputs of the plurality of transmitters;
wherein each receive switch in the plurality of receive switches is configured to sequentially switch return link signals from fixed location beams into a receiver according to a beam group receive switching pattern;
wherein prior to time T, the return link signals from multiple fixed location beams are sequentially switched into the plurality of receivers according to a first beam group receive switching pattern, and in the duration of one frame, the gateway switch structure is configured to sequentially switch the return link signals to at least P transmitters in the plurality of transmitters according to the first gateway switching pattern, and the at least P transmitters are each configured to transmit a different one of the return link signals to one of the P gateway terminals; and
wherein after time T, the return link signals from multiple fixed location beams are sequentially switched into the plurality of receivers according to a second beam group receive switching pattern, and in the duration of one frame, the gateway switch structure is configured to sequentially switch the return link signals to at least Q transmitters in the plurality of transmitters according to the second gateway switching pattern, and the at least Q transmitters are each configured to transmit a different one of the return link signals to one of the Q gateway terminals.

27. A hub-spoke satellite having a forward link capability comprising:
a plurality of receivers having inputs and outputs;
a plurality of transmitters having inputs and outputs, the inputs of the plurality of transmitters coupled to the outputs of the plurality of receivers;
a plurality of transmit switches coupled to the outputs of the plurality of transmitters;
wherein each transmit switch in the plurality of transmit switches is configured to sequentially switch a forward link signal into multiple fixed location beams according to a beam group transmit switching pattern;
a gateway switch structure coupled to one of: (a) the inputs of the plurality of receivers, and (b) the outputs of the plurality receivers and the inputs of the plurality of transmitters;
wherein prior to a time T, at least P receivers in the plurality of receivers are each configured to receive a different one of at least P forward link signals from P gateway terminals, and in the duration of one frame, the gateway switch structure is configured to sequentially switch the at least P forward link signals from the P gateway terminals, in order to provide the at least P forward link signals to the plurality of transmit switches, according to a first gateway switching pattern, and each of the at least P forward link signals is sequentially switched into fixed location beams according to a first beam group transmit switching pattern;
wherein after time T, at least Q receivers in the plurality of receivers are each configured to receive a different one of at least Q forward link signals from Q gateway terminals, and in the duration of one frame, the gateway switch structure is configured to sequentially switch the at least Q forward link signals from the Q gateway terminals, in order to provide the at least Q forward link signals to the plurality of transmit switches, according to a second gateway switching pattern, and each of the at least Q forward link signals is sequentially switched into fixed location beams according to a second beam group transmit switching pattern;
wherein P and Q are both non-zero, positive integers, and Q>P; and
wherein the first and second gateway switching patterns are different.

28. A hub-spoke satellite having a forward link capability comprising:
prior to a time T:
means for receiving at least P forward link signals from P gateway terminals;
means for sequentially switching the at least P forward link signals from the P gateway terminals in the duration of one frame, in order to provide the at least P forward link signals to a plurality of transmit switches, according to a first gateway switching pattern;
means for sequentially switching each of the at least P forward link signals into fixed location beams according to a first beam group transmit switching pattern;
after time T:
means for receiving at least Q forward link signals from Q gateway terminals;
means for sequentially switching the at least Q forward link signals from the Q gateway terminals in the duration of one frame, in order to provide the at least Q forward link signals to the plurality of transmit switches, according to a second gateway switching pattern;
means for sequentially switching each of the at least Q forward link signals into fixed location beams according to a second beam group transmit switching pattern;
wherein P and Q are both non-zero, positive integers, and Q>P; and
wherein the first and second gateway switching patterns are different.

* * * * *